United States Patent
Ishizuka et al.

(10) Patent No.: US 12,469,645 B2
(45) Date of Patent: Nov. 11, 2025

(54) MULTILAYER CERAMIC CAPACITOR INCLUDING EXTERNAL ELECTRODE COVERED WITH SIDE GAP PORTION

(71) Applicant: Murata Manufacturing Co., Ltd., Nagaokakyo (JP)

(72) Inventors: Akira Ishizuka, Nagaokakyo (JP); Shun Shimasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 356 days.

(21) Appl. No.: 18/108,070

(22) Filed: Feb. 10, 2023

(65) Prior Publication Data
US 2023/0274886 A1 Aug. 31, 2023

(30) Foreign Application Priority Data
Feb. 25, 2022 (JP) ................. 2022-027706

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/12* (2013.01); *H01G 4/232* (2013.01)

(58) Field of Classification Search
CPC .......... H01G 4/30; H01G 4/008; H01G 4/012; H01G 4/12; H01G 4/232; H01G 4/1227; H01G 4/005
See application file for complete search history.

(56) References Cited

U.S. PATENT DOCUMENTS

| 7,088,569 B1 * | 8/2006 | Togashi | H01G 4/30 361/306.3 |
| 2013/0057112 A1 * | 3/2013 | Shirakawa | H01G 4/12 336/200 |

(Continued)

FOREIGN PATENT DOCUMENTS

| JP | 2014082434 A | 5/2014 |
| JP | 2016-086118 A | 5/2016 |

(Continued)

OTHER PUBLICATIONS

Notice of Reasons for Refusal in JP2022-027706, mailed Mar. 12, 2024, 2 pages.

*Primary Examiner* — Timothy J. Dole
*Assistant Examiner* — Daniel M Dubuisson
(74) *Attorney, Agent, or Firm* — Keating & Bennett, LLP

(57) ABSTRACT

A multilayer ceramic capacitor includes a multilayer body including first and second dielectric layers, two main surfaces, two lateral surfaces, two end surfaces, and an inner layer portion including first and second internal electrodes laminated alternately therein with one of the dielectric layers interposed therebetween, outer dielectric layer portions that sandwich the inner layer portion in a lamination direction, and side gap portions that sandwich the inner layer portion and the outer layer portions in a width direction. The multilayer body includes first and second external electrodes connected to the first and second internal electrodes, respectively. The first external electrode includes a main surface electrode portion on at least one of the two main surfaces, and a lateral surface electrode portion connected to at least one lateral surface side end portion of each of the first internal electrodes and is covered with one of the side gap portions.

20 Claims, 18 Drawing Sheets

(51) Int. Cl.
*H01G 4/012* (2006.01)
*H01G 4/12* (2006.01)
*H01G 4/232* (2006.01)

(56) References Cited

U.S. PATENT DOCUMENTS

| | | |
|---|---|---|
| 2014/0104750 A1 | 4/2014 | Ahn et al. |
| 2014/0160617 A1* | 6/2014 | Kim ................ H01G 4/224 |
| | | 361/301.4 |
| 2014/0168851 A1* | 6/2014 | Lee ................ H01G 4/012 |
| | | 361/303 |
| 2014/0345926 A1* | 11/2014 | Lee ................. H01G 4/30 |
| | | 361/301.4 |
| 2017/0334230 A1 | 11/2017 | Sawada et al. |
| 2018/0019064 A1 | 1/2018 | Han et al. |
| 2020/0006004 A1* | 1/2020 | Kojima ............. H01G 4/232 |
| 2020/0258689 A1 | 8/2020 | Kato |
| 2023/0207200 A1* | 6/2023 | Son ................. H01G 4/1227 |
| | | 361/301.4 |

FOREIGN PATENT DOCUMENTS

| | | |
|---|---|---|
| JP | 2017205951 A | 11/2017 |
| JP | 2018011047 A | 1/2018 |
| JP | 2018207091 A | 12/2018 |
| JP | 2020-136298 A | 8/2020 |

\* cited by examiner

MULTILAYER CERAMIC CAPACITOR INCLUDING EXTERNAL ELECTRODE COVERED WITH SIDE GAP PORTION

CROSS REFERENCE TO RELATED APPLICATIONS

This application claims the benefit of priority to Japanese Patent Application No. 2022-027706 filed on Feb. 25, 2022. The entire contents of this application are hereby incorporated herein by reference.

BACKGROUND OF THE INVENTION

1. Field of the Invention

The present invention relates to a multilayer ceramic capacitor.

2. Description of the Related Art

Japanese Unexamined Patent Application Publication No. 2016-86118 discloses a multi-terminal multilayer ceramic capacitor. On the lateral surfaces of the multilayer ceramic capacitor, side gap portions functioning as a protective member are provided for preventing the lateral surface side end portion of the internal electrode from being exposed. With the recent reduction in size of electronic devices, it is desired to reduce the size of multi-terminal multilayer ceramic capacitors mounted on electronic devices. Japanese Unexamined Patent Application Publication No. 2020-136298 discloses a means for providing the side gap portions later as one means for reducing the size of the multilayer ceramic capacitor. In this method, a multilayer body in which the internal electrodes are exposed on the lateral surfaces is prepared, and then the side gap portions are provided on the lateral surfaces on which the internal electrodes are exposed. By this method, the side gap portions can be made thin, and the size of the multilayer ceramic capacitor can be easily reduced. However, in a multi-terminal multilayer ceramic capacitor including three or more terminals in which external electrodes need to be provided on the lateral surfaces, it is difficult to use the method of providing the side gap portions later.

SUMMARY OF THE INVENTION

Preferred embodiments of the present invention provide multi-terminal multilayer ceramic capacitors each including three or more terminals to which a method of providing side gap portions later can be easily applied.

A preferred embodiment of the present invention provides a multilayer ceramic capacitor including at least one first dielectric layer including at least one first internal electrode, at least one second dielectric layer including at least one second internal electrode, and a multilayer body including the first dielectric layer and the second dielectric layer provided alternately therein, in which the multilayer body includes two main surfaces, two lateral surfaces, and two end surfaces, the multilayer body includes an inner layer portion including the first internal electrode and the second internal electrode laminated alternately therein with the dielectric layer interposed therebetween, outer layer portions that sandwich the inner layer portion in a lamination direction and are made of a dielectric material, and side gap portions that sandwich the inner layer portion and the outer layer portions in a width direction, the multilayer body includes a first external electrode connected to the first internal electrode and a second external electrode connected to the second internal electrode, and the first external electrode includes a main surface electrode portion provided on at least one of the two main surfaces, and a lateral surface electrode portion that is connected to at least one lateral surface side end portion of each of the first internal electrodes and is covered with one of the side gap portions.

According to preferred embodiments of the present invention, it is possible to provide multi-terminal multilayer ceramic capacitors including three or more terminals to which a method of providing side gap portions later can be easily applied.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
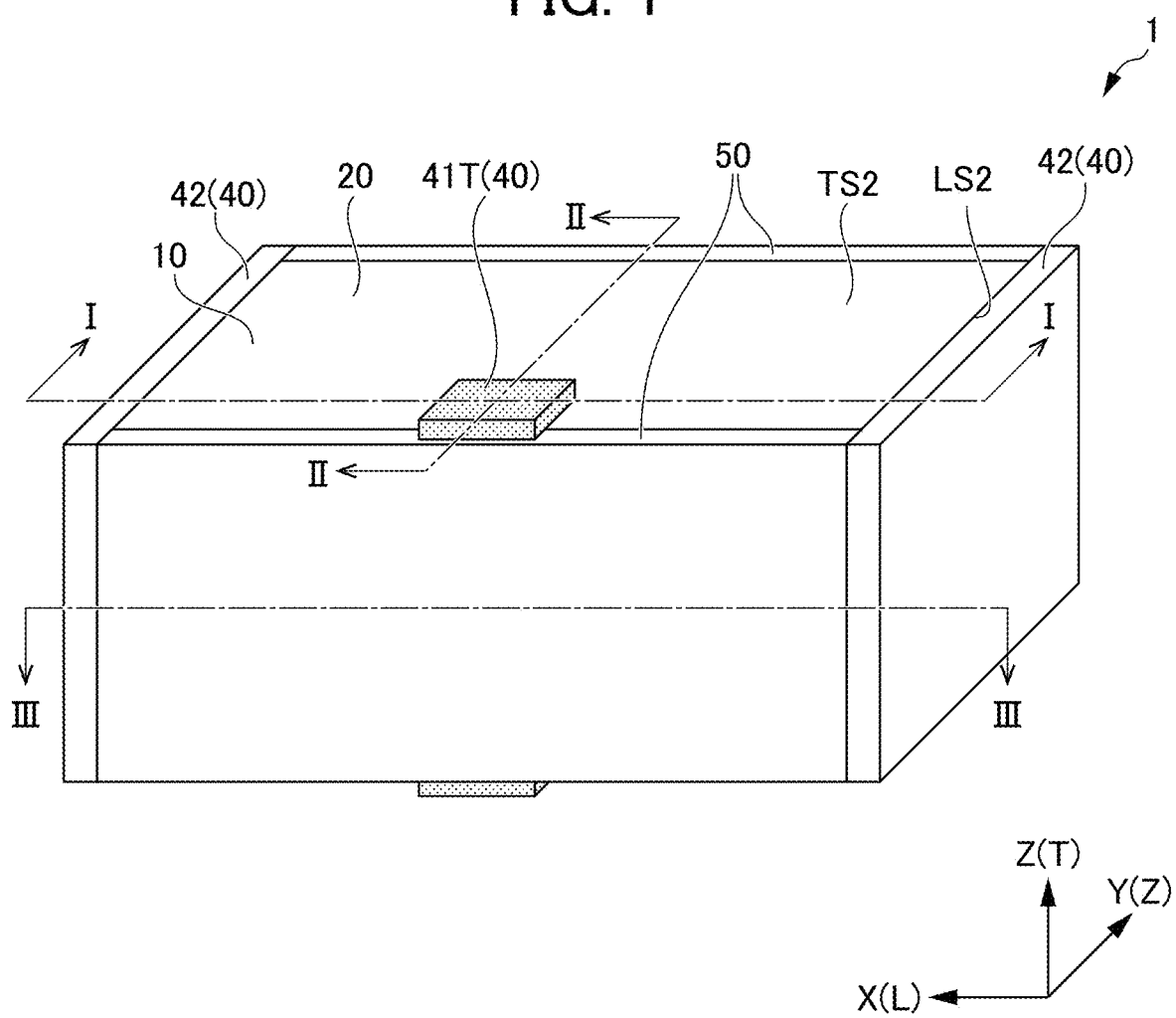
FIG. 1 is a perspective view showing a multilayer ceramic capacitor according to a first preferred embodiment of the present invention.

Hereinafter, preferred embodiments of the present invention will be described with reference to the accompanying drawings. In the drawings, the same or corresponding portions are denoted by the same reference numerals.

Outline of Multilayer Ceramic Capacitor (First Preferred Embodiment)

Figure 2:
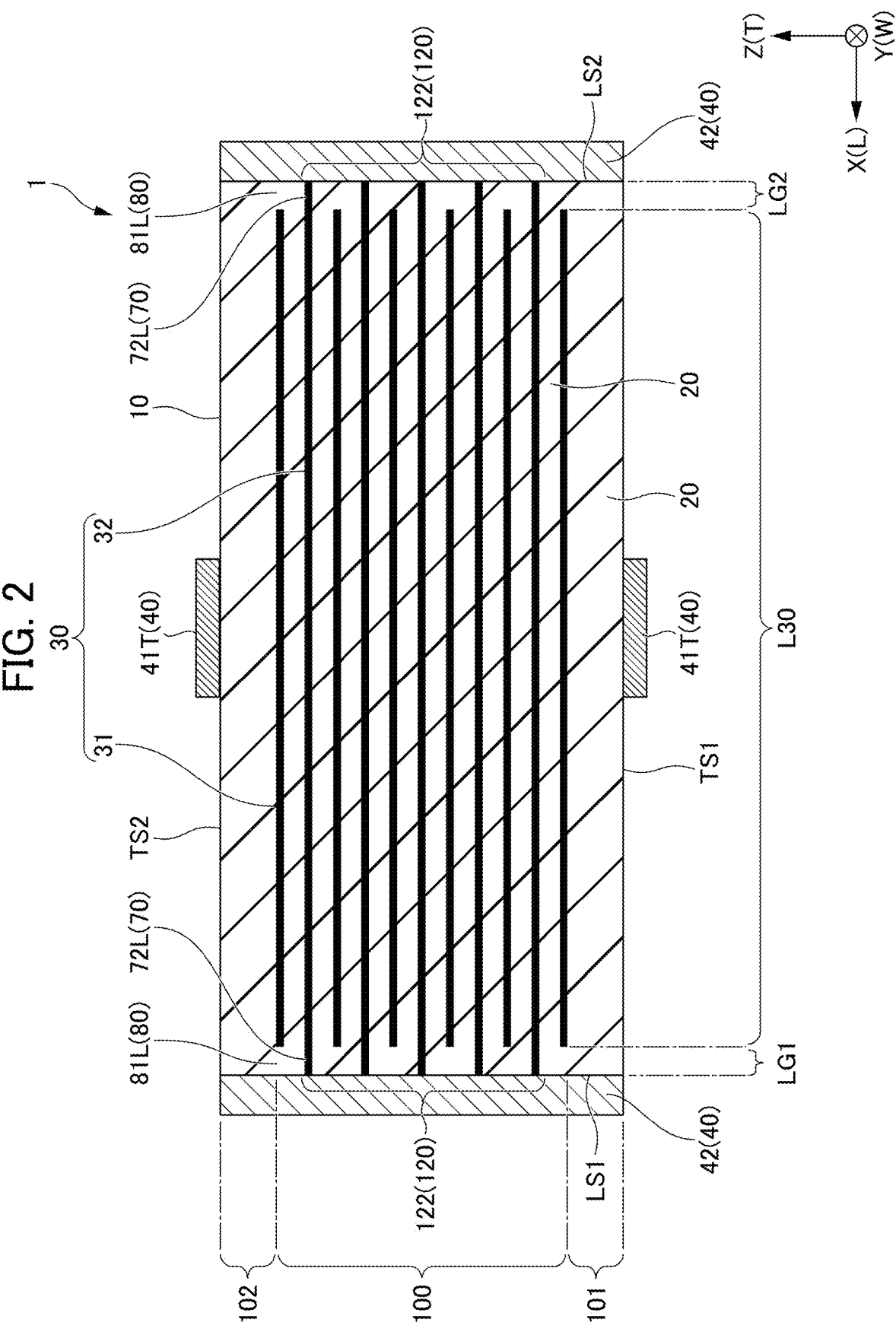
FIG. 2 is a cross-sectional view (LT cross-section) taken along the line I-I of the multilayer ceramic capacitor shown in FIG. 1.
Figure 3:
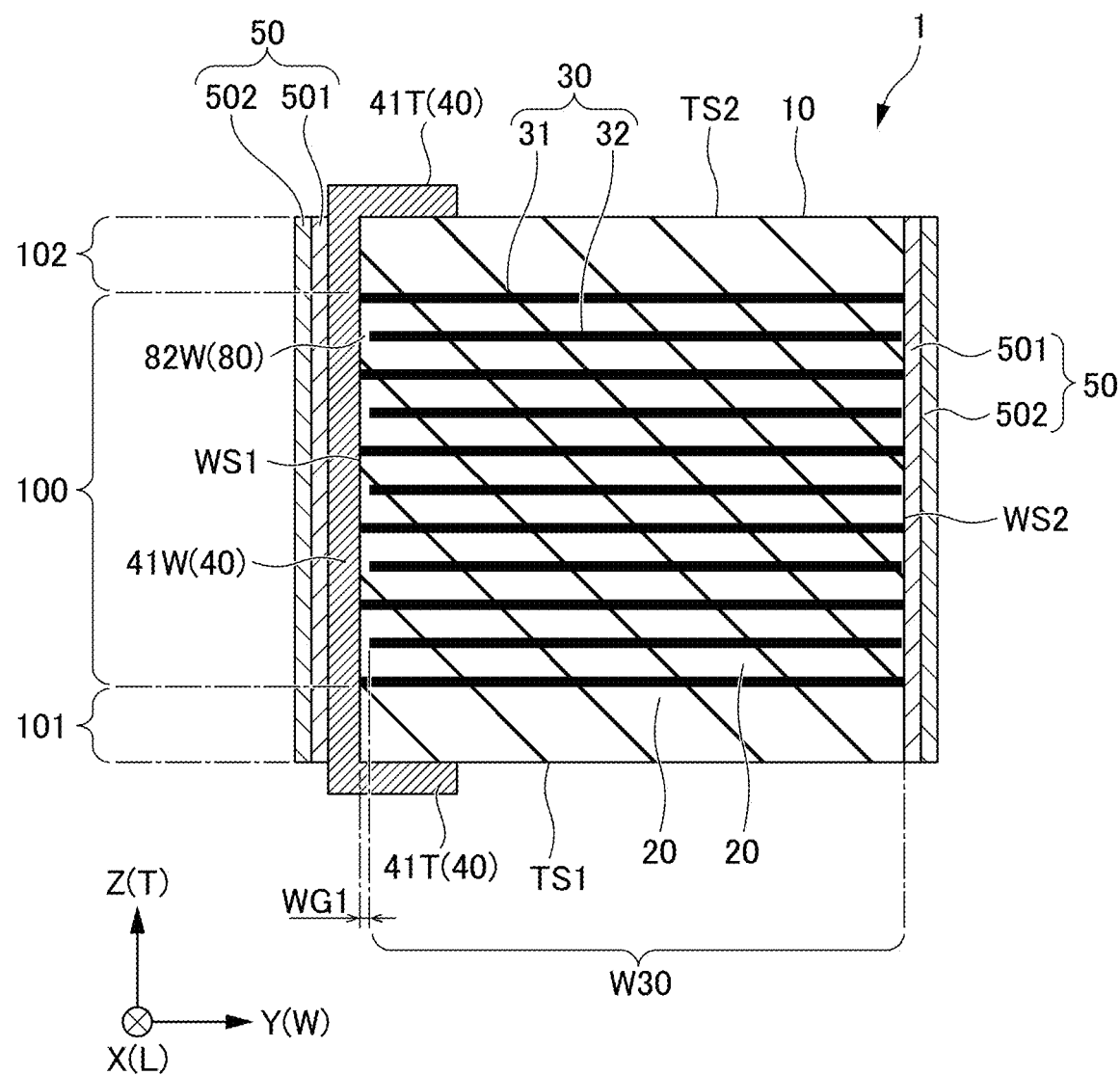
FIG. 3 is a cross-sectional view (WT cross-section) taken along the line II-II of the multilayer ceramic capacitor shown in FIG. 1.
Figure 4A:
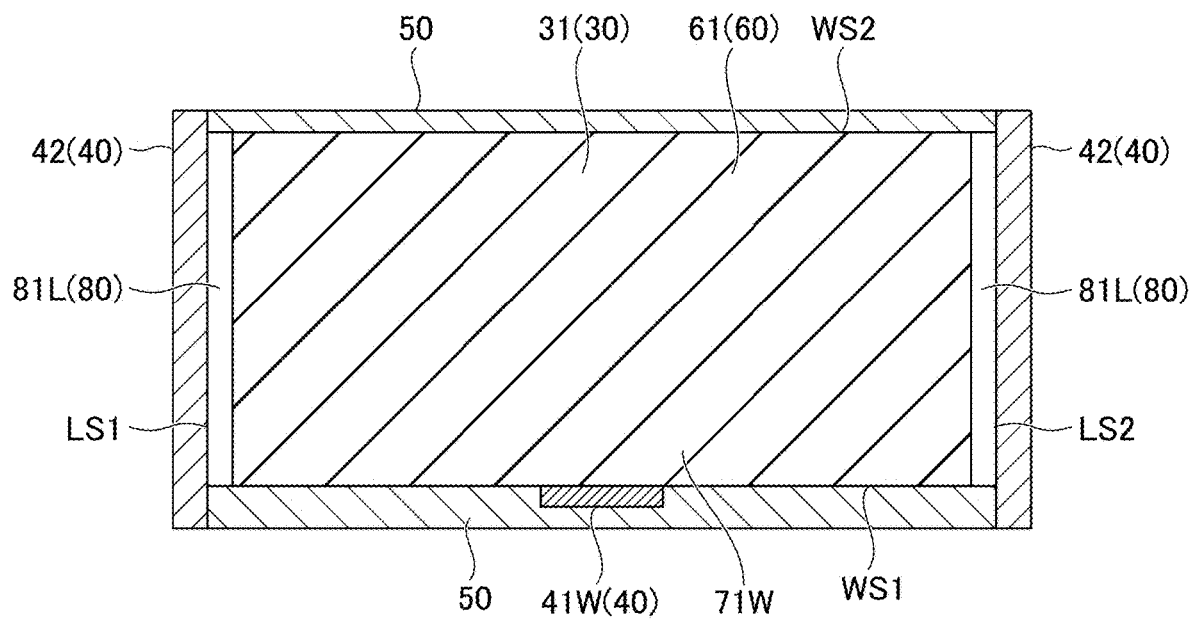
FIGS. 4A and 4B are cross-sectional views (LW cross-section) taken along the line III-III of the multilayer ceramic capacitor shown in FIG. 1, with FIG. 4A showing a first internal electrode and FIG. 4B showing a second internal electrode.
Figure 4B:
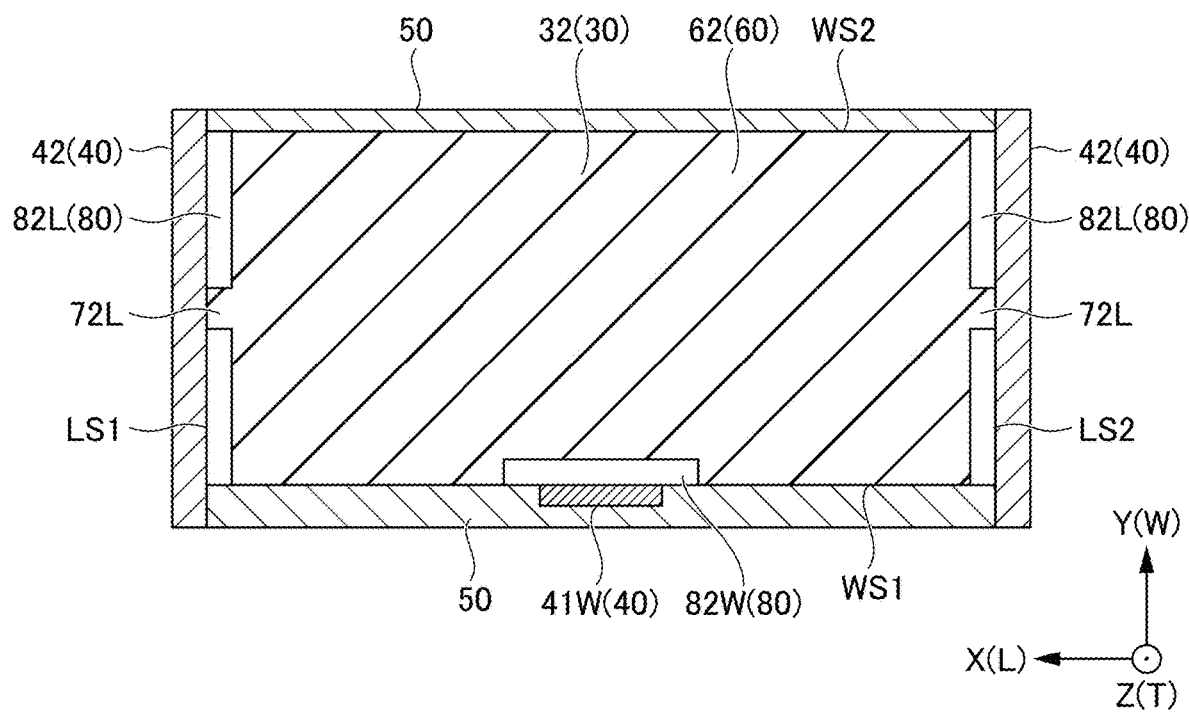
Figure 5:
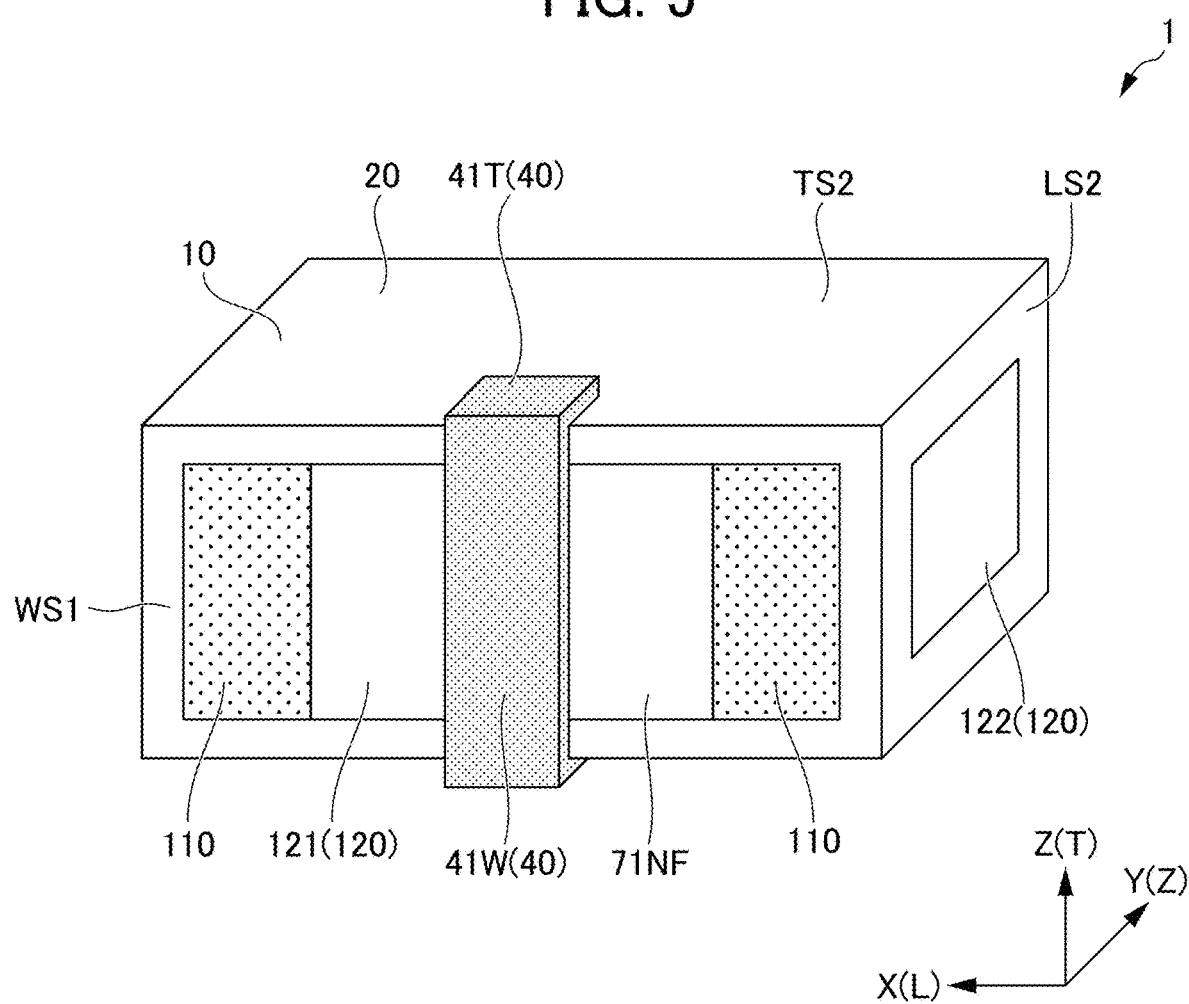
FIG. 5 is a perspective view showing a state before side gap portions are provided in the multilayer ceramic capacitor of the first preferred embodiment of the present invention.
Figure 6:
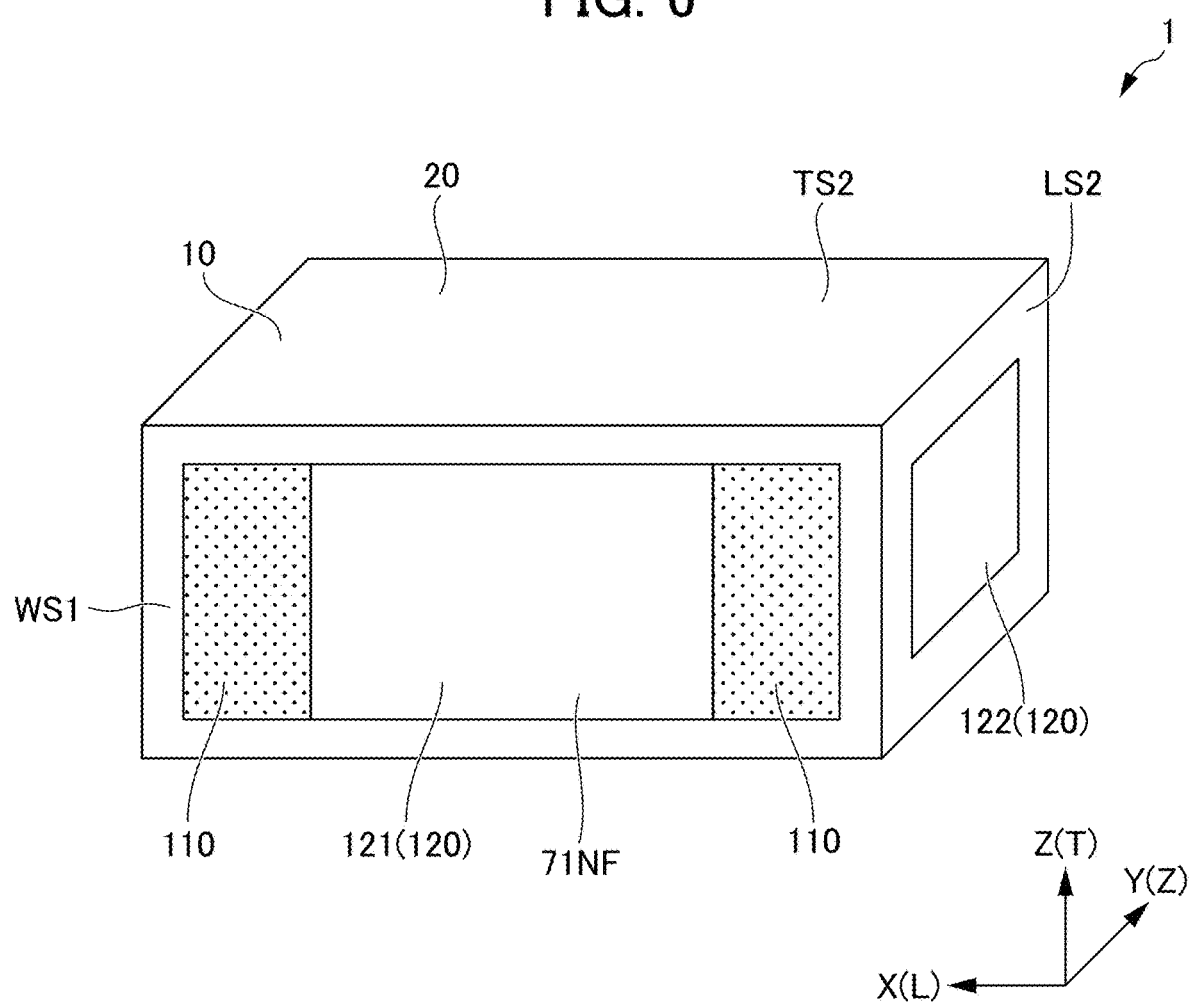
FIG. 6 is a perspective view showing a state before an external electrode and side gap portions are provided in the multilayer ceramic capacitor of the first preferred embodiment of the present invention.

A multilayer ceramic capacitor 1 according to a first preferred embodiment of the present invention will be described with reference to FIGS. 1 to 6. FIG. 1 is a perspective view showing a multilayer ceramic capacitor 1 according to a first preferred embodiment of the present invention. FIG. 2 is a cross-sectional view taken along the line I-I of the multilayer ceramic capacitor 1 shown in FIG. 1. FIG. 3 is a cross-sectional view taken along the line II-II of the multilayer ceramic capacitor 1 shown in FIG. 1. FIGS. 4A and 4B are cross-sectional views taken along the line III-III of the multilayer ceramic capacitor 1 shown in FIG. 1. FIG. 5 is a perspective view showing a state before side gap portions 50 are provided in the multilayer ceramic capacitor 1 of the first preferred embodiment. FIG. 6 is a perspective view showing a state before an external electrode 40 and the side gap portion 50 are provided in the multilayer ceramic capacitor 1 of the first preferred embodiment. The multilayer ceramic capacitor 1 shown in FIGS. 1 to 4B includes a multilayer body 10 and an external electrode 40. The external electrode 40 includes a first external electrode 41 and a second external electrode 42. The multilayer body 10 is provided with the side gap portion 50.

Definition of Direction

In each figure, an XYZ orthogonal coordinate system is shown as necessary. The X direction refers to the length direction L of the multilayer ceramic capacitor 1 and the multilayer body 10. The Y direction refers to the width direction W of the multilayer ceramic capacitor 1 and the multilayer body 10. The Z direction refers to the lamination direction T of the multilayer ceramic capacitor 1 and the multilayer body 10. Thus, the cross section shown in FIG. 2 is also referred to as an LT cross section, the cross section shown in FIG. 3 is also referred to as a WT cross section, and the cross section shown in FIGS. 4A and 4B are also referred to as an LW cross section. The length direction L, the width direction W, and the lamination direction T are not necessarily orthogonal to each other, and may intersect each other.

Multilayer Body

The multilayer body 10 has a substantially rectangular parallelepiped shape, and includes a first main surface TS1 and a second main surface TS2 opposed to each other in the lamination (stacking) direction T, a first lateral surface WS1 and a second lateral surface WS2 opposed to each other in the width direction W, and a first end surface LS1 and a second end surface LS2 opposed to each other in the length direction L. Corner portions and ridge portions of the multilayer body 10 may be rounded. The corner portions are each a portion where the three surfaces of the multilayer body 10 intersect, and the ridge portions are each a portion where the two surfaces of the multilayer body 10 intersect. As shown in FIGS. 2 and 3, the multilayer body 10 includes a plurality of dielectric layers 20 and a plurality of internal electrodes 30 laminated (stacked) in the lamination direction T. The multilayer body 10 includes an inner layer portion 100, and a first outer layer portion 101 and a second outer layer portion 102 that sandwich the inner layer portion 100 in the lamination direction T.

Inner Layer Portion

The inner layer portion 100 includes a portion of the plurality of dielectric layers 20 and the plurality of internal electrodes 30. In the inner layer portion 100, the plurality of internal electrodes 30 are opposed to each other with the dielectric layer 20 interposed therebetween. The inner layer portion 100 is a portion that generates capacitance and substantially functions as a capacitor. Therefore, the inner layer portion 100 is also referred to as an effective region.

Outer Layer Portion

The first outer layer portion 101 is adjacent to the first main surface TS1 of the multilayer body 10, and the second outer layer portion 102 is adjacent to the second main surface TS2 of the multilayer body 10. More specifically, the first outer layer portion 101 is provided between the first main surface TS1 and the internal electrode 30 closest to the first main surface TS1 among the plurality of internal electrodes 30, and the second outer layer portion 102 is provided between the second main surface TS2 and the internal electrode 30 closest to the second main surface TS2 among the plurality of internal electrodes 30. The first outer layer portion 101 or the second outer layer portion 102 does not include any internal electrode 30, and each of the first outer layer portion 101 and the second outer layer portion 102 includes a portion other than the portions for the inner layer portion 100 among the plurality of dielectric layers 20. The first outer layer portion 101 and the second outer layer portion 102 each function as a protective layer of the inner layer portion 100.

Segmentation in Length Direction L

As shown in FIG. 2, the multilayer body 10 includes an electrode counter portion L30 where the internal electrodes 30 are opposed to each other, a first end surface-side gap portion LG1, and a second end surface-side gap portion LG2 in the length direction L. The first end surface-side gap portion LG1 is positioned between the electrode counter portion L30 and the first end surface LS1, and the second end surface-side gap portion LG2 is positioned between the electrode counter portion L30 and the second end surface LS2. The first end surface-side gap portion LG1 and the second end surface-side gap portion LG2 are portions where the internal electrodes 30 are not opposed to each other in the lamination direction T. The first end surface-side gap portion LG1 and the second end surface-side gap portion LG2 are also each referred to as an L gap.

Cross-Sectional Structure in Width Direction W

Next, the cross-sectional structure of the multilayer body 10 in the width direction W will be described with reference to FIG. 3. As shown in FIG. 3, the multilayer body 10 has an electrode counter portion W30 where the internal electrodes 30 are opposed to each other in the width direction W, and a first lateral surface-side gap portion WG1 positioned between the electrode counter portion W30 and the first lateral surface WS1. The first lateral surface-side gap portion WG1 is a portion where the internal electrodes 30 are not opposed to each other in the lamination direction T. The first lateral surface-side gap portion WG1 is also referred to as a W gap.

Dimensions of Multilayer Body

The dimensions of the multilayer body 10 described above are not particularly limited, but preferably, for example, the length in the length direction L is about 1.55 mm or more and about 1.65 mm or less, the width in the width direction W is about 0.75 mm or more and about 0.85 mm or less, and the thickness in the lamination direction T is about 0.75 mm or more and about 0.85 mm or less.

Appearance of Multilayer Ceramic Capacitor

The appearance, etc. of the multilayer ceramic capacitor 1 of the first preferred embodiment are as follows. The multilayer body 10 included in the multilayer ceramic capacitor 1 has a substantially rectangular parallelepiped shape. The dielectric layer 20 and a portion of the external electrode 40 are exposed on each of the first main surface TS1 and the second main surface TS2 of the multilayer body 10. The external electrodes 40 are provided on the first end surface LS1 and the second end surface LS2 of the multilayer body 10. The side gap portions 50 are provided on the first lateral surface WS1 and the second lateral surface WS2 of the multilayer body 10. The external electrode 40 partially exposed from the first main surface TS1 and the second main surface TS2 and the external electrodes 40 provided on the first end surface LS1 and the second end surface LS2 are connected to different internal electrodes 30.

External Electrode

The external electrodes 40 include the first external electrode 41 and the second external electrodes 42. The first external electrode 41 refers to the external electrode 40 connected to the first internal electrode 31. On the other hand, the second external electrodes 42 refer to the external electrodes 40 connected to the second internal electrode 32. The external electrode 40 partially exposed on the first main surface TS1 and the second main surface TS2 refers to the first external electrode 41. On the other hand, the external electrodes 40 provided on the first end surface LS1 and the second end surface LS2 refer to the second external electrodes 42. The first external electrode 41 is connected to, for example, a wire having a GND potential, and the second external electrodes 42 are each connected to, for example, a wire having a signal potential.

Side Gap Portion

The side gap portions 50 refer to dielectric layers provided on the first lateral surface WS1 and the second lateral surface WS2 in order to prevent the internal electrodes 30 from being exposed on the first lateral surface WS1 and the second lateral surface WS2 of the multilayer body 10. One of the side gap portions 50 is provided on the first lateral surface WS1 to cover the first external electrode 41 provided on the first lateral surface WS1. Therefore, the first external electrode 41 is not exposed on the first lateral surface WS1.

As shown in FIG. 3, the side gap portions 50 each include an inner side gap layer 501 and an outer side gap layer 502. The main materials of the inner side gap layer 501 and the outer side gap layer 502 are dielectric materials. The amount of Si contained in the dielectric material is different between the inner side gap layer 501 and the outer side gap layer 502.

Hereinafter, members of the multilayer ceramic capacitor 1 and the structure thereof will be described.

First Internal Electrode and Second Internal Electrode

The internal electrodes 30 include a plurality of first internal electrodes 31 and a plurality of second internal electrodes 32. The plurality of first internal electrodes 31 and the plurality of second internal electrodes 32 are alternately provided in the lamination direction T with the dielectric layers 20 interposed therebetween. The internal electrodes 30 are each provided on the dielectric layer 20. The dielectric layers 20 at which the first internal electrodes 31 are provided are referred to as first dielectric layers. Similarly, the dielectric layers 20 at which the second internal electrodes 32 are provided are referred to as second dielectric layers. FIGS. 4A and 4B are cross-sectional views taken along the line III-III of the multilayer ceramic capacitor shown in FIG. 1. FIG. 4A is a cross-sectional view of a portion where the first internal electrode 31 is provided in the lamination direction T. On the other hand, FIG. 4B is a cross-sectional view of a position where the second internal electrode 32 is provided in the lamination direction T. FIG. 4A shows the first internal electrode 31 in a plan view. On the other hand, FIG. 4B shows the second internal electrode 32 in a plan view. Here, "plan view" indicates that the multilayer body 10 is viewed in the direction of the lamination direction T. As shown in FIGS. 4A and 4B, the first internal electrode 31 and the second internal electrode 32 have different shapes in a plan view.

Main Electrode Portion and Extension Electrode Portion

The internal electrode 30 includes a main electrode portion 60 and an extension electrode portion 70. Here, the main electrode portion 60 of the first internal electrode 31 is referred to as a first main electrode portion 61, and the extension electrode portion 70 of the first internal electrode 31 is referred to as a first extension electrode portion 71. Similarly, the main electrode portion 60 of the second internal electrode 32 is referred to as a second main electrode portion 62, and the extension electrode portion 70 of the second internal electrode 32 is referred to as a second extension electrode portion(s) 72.

Extension Electrode Portion

The extension electrode portion 70 is a certain portion of the internal electrode 30 that is not opposed to the other internal electrodes 30 connected to the different external electrodes 40 in the lamination direction T. When the internal electrode 30 extends from the certain portion in the direction of the lateral surface or the end surface in contact with the certain portion, the extension electrode portion 70 is defined as a portion including both the certain portion and such an internal electrode 30. More specifically, the first extension electrode portion 71 is a portion of the first internal electrode 31 that is not opposed to the second internal electrode 32 in the lamination direction T. Similarly, the second extension electrode portions 72 are each a portion of the second internal electrode 32 that is not opposed to the first internal electrode 31 in the lamination direction T.

Main Electrode Portion

The main electrode portion 60 refers to a portion other than the extension electrode portion 70 of the internal electrodes 30. More specifically, the first main electrode portion 61 refers to a portion other than the first extension electrode portion 71 of the first internal electrodes 31. Similarly, the second main electrode portion 62 refers to a portion other than the second extension electrode portion 72 of the second internal electrodes 32.

Counter Portion and Non-Counter Portion of Extension Electrode Portion

The extension electrode portion 70 includes a counter portion and a non-counter portion. Here, the counter portion of the first extension electrode portion 71 is referred to as a first extension electrode counter portion 71F, and the non-counter portion of the first extension electrode portion 71 is referred to as a first extension electrode non-counter portion 71NF. Similarly, the counter portion of the second extension electrode portion 72 is referred to as a second extension electrode counter portion 72F, and the non-counter portion of the second extension electrode portion 72 is referred to as a second extension electrode non-counter portion 72NF.

Counter Portion of Extension Electrode Portion

The counter portion of the extension electrode portion 70 refers to a portion of the extension electrode portion 70 opposed to other extension electrode portions 70 connected to different external electrodes 40 in the lamination direction T. More specifically, the first extension electrode counter portion 71F refers to a portion of the first extension electrode portion 71 opposed to the second extension electrode portion 72 in the lamination direction T. Similarly, the second extension electrode counter portion 72F refers to a portion of the second extension electrode portion 72 opposed to the first extension electrode portion 71 in the lamination direction T. The counter portion is a portion capable of generating a capacitance.

Non-Counter Portion of Extension Electrode Portion

The non-counter portion of the extension electrode portion 70 refers to a portion of the extension electrode portion 70 other than the counter portion of the extension electrode portion 70. More specifically, the first extension electrode non-counter portion 71NF refers to a portion other than the first extension electrode counter portion 71F in the first extension electrode portion 71. Similarly, the second extension electrode non-counter portion 72NF refers to a portion other than the second extension electrode counter portion 72F in the second extension electrode portion 72.

Counter Portion and Non-Counter Portion of Internal Electrode

The main electrode portion 60 is opposed to the other internal electrodes 30 connected to the different external electrodes 40 in the lamination direction T. Therefore, unlike the extension electrode portion 70, the main electrode portion 60 entirely functions as a counter portion. As described above, the counter portion of the internal electrode 30 refers to a portion obtained by combining the main electrode portion 60 and the counter portion of the extension electrode portion 70. The non-counter portion of the internal electrode 30 is the same as the non-counter portion of the extension electrode portion 70.

Schematic Shape of Internal Electrode

The internal electrode 30 has substantially the same shape as that of the multilayer body 10 in a plan view. That is, the internal electrode 30 has a substantially quadrangular shape. However, the shape of the multilayer body 10 in a plan view and the shape of the internal electrode 30 in a plan view do not completely match each other.

Notch

When the outer shape of the multilayer body 10 in a plan view and the outer shape of the internal electrode 30 in a plan view are compared, a portion of the outer shape of the internal electrode 30 missing from the outer shape of the multilayer body 10 is referred to as a notch 80. The outer shape of the internal electrode 30 in a plan view may be simply referred to as an outer shape of the internal electrode 30.

Hereinafter, referring to FIGS. 4A and 4B, the internal electrode 30 will be described in the order of the first internal electrode 31 and the second internal electrode 32.

Summary of First Internal Electrode

As shown in FIG. 4A, the outer shape of the first internal electrode 31 includes a notch 80 at the end surface. On the other hand, the outer shape of the first internal electrode 31 does not include the notch 80 at the lateral surface. The first internal electrode 31 includes the extension electrode portion 70 on a lateral surface thereof.

Notch at End Surface

The outer shape of the first internal electrode 31 includes the notch 80 at a position corresponding to the first end surface LS1 and at a position corresponding to the second end surface LS2. This notch 80 is referred to as an end surface first notch 81L. The end surface first notch 81L extends from one end to the other end at a position corresponding to the first end surface LS1 and a position corresponding to the second end surface LS2. On the other hand, the outer shape of the first internal electrode 31 does not include the notch 80 at a position corresponding to the first lateral surface WS1 and a position corresponding to the second lateral surface WS2. The position corresponding to the first end surface LS1 indicates a position of a portion of the first end surface LS1 of the multilayer body 10 when laminated to become a portion of the multilayer body 10. Similar expressions are used for other surfaces.

Extension Electrode Portion at Lateral Surface

The first internal electrode 31 includes the extension electrode portion 70 at a position corresponding to the first lateral surface WS1. This extension electrode portion 70 is referred to as a lateral surface-first extension electrode portion 71W. The lateral surface-first extension electrode portion 71W corresponds to a portion of the first internal electrode 31 which is opposed to a lateral surface second notch 82W of the second internal electrode 32, which will be described later, in the lamination direction T. The lateral surface-first extension electrode portion 71W is provided at the center portion of the position corresponding to the first lateral surface WS1.

The configuration of the end surface and the lateral surface of the first internal electrode 31 according to the first preferred embodiment will be summarized.

Arrangement Order at End Surface

In the first internal electrode 31, the end surface first notch 81L extends from one end to the other end at a position corresponding to the first end surface LS1 and a position corresponding to the second end surface LS2. Therefore, the first extension electrode portion 71 is not provided at a position corresponding to the first end surface LS1 and a position corresponding to the second end surface LS2.

Arrangement Order at Lateral Surface

In the first internal electrode 31, the end surface first notch 81L, the first main electrode portion 61, the lateral surface-first extension electrode portion 71W, the first main electrode portion 61, and the end surface first notch 81L are provided at a position corresponding to the first lateral surface WS1 in this order from one end to the other end. On the other hand, in the first internal electrode 31, the end surface first notch 81L, the first main electrode portion 61, and the end surface-first notch 81L are provided at a position corresponding to the first lateral surface WS2 in this order from one end to the other end.

Second Internal Electrode

Next, the second internal electrode will be described with reference to FIG. 4B. Similar to the first internal electrode 31, the outer shape of the second internal electrode 32 includes a notch 80. However, the position is different from that of the first internal electrode 31. The second internal electrode 32 includes the extension electrode portion 70 at the end surface and the lateral surface.

First, the end surface will be described.

Notch at End Surface

The outer shape of the second internal electrode 32 includes the notch 80 at a position corresponding to the first end surface LS1 and at a position corresponding to the second end surface LS2. This notch 80 is referred to as an end surface second notch 82L. The end surface second notches 82L are provided at both end portions at positions corresponding to the first end surface LS1, as well as at both end portions at positions corresponding to the second end surface LS2. Therefore, the total number of the end surface second notches 82L is four.

Extension Electrode Portion at End Surface

The second internal electrode 32 includes the extension electrode portion 70 at a position corresponding to the first end surface LS1 and at a position corresponding to the second end surface LS2. The extension electrode portion 70 is referred to as an end surface-second extension electrode portion 72L. The end surface-second extension electrode portion 72L is provided at a center portion at a position corresponding to the first end surface LS1 and at a center portion at a position corresponding to the second end surface LS2, respectively. The total number of the end surface-second extension electrode portion 72L is two.

Next, the lateral surface will be described.

Notch at Lateral Surface

The outer shape of the second internal electrode 32 includes the notch 80 at a position corresponding to the first lateral surface WS1. This notch 80 is referred to as a lateral surface second notch 82W. The lateral surface second notch 82W is provided at the center portion at a position corresponding to the first lateral surface WS1.

Extension Electrode Portion at Lateral Surface

The second internal electrode 32 does not include the extension electrode portion 70 at a position corresponding to the first lateral surface WS1 and a position corresponding to the second lateral surface WS2. This is because the second internal electrode 32 at the lateral surface is opposed to the first internal electrodes 31 in the lamination direction T.

The configuration of the end surface and the lateral surface of the second internal electrode 32 of the first preferred embodiment will be summarized.

Arrangement Order at End Surface

In the second internal electrode 32, the end surface second notch 82L, the end surface-second extension electrode portion 72L, and the end surface second notch 82L are provided at a position corresponding to the first end surface LS1 and a position corresponding to the second end surface LS2 in this order from one end to the other end.

Arrangement Order at Lateral Surface

In the second internal electrode 32, the end surface second notch 82L, the second main electrode portion 62, the lateral surface-second notch 82W, the second main electrode portion 62, and the end surface second notch 82L are provided at a position corresponding to the first lateral surface WS1 in this order from one end to the other end. On the other hand, the end surface second notch 82L, the second main electrode portion 62, and the end surface second notch 82L are provided at a position corresponding to the second lateral surface WS2 in this order from one end to the other end.

Each Surface of Multilayer Body

The configuration of the multilayer body 10 will be described with reference to FIG. 5. By laminating the first internal electrodes 31 and the second internal electrodes 32 described above, the multilayer body 10 includes the surfaces as shown in FIG. 5. Effective portions 110 are exposed at the first lateral surface WS1 of the multilayer body 10, and an extension portion 120 is provided at the first lateral surface WS1. Furthermore, the extension portion 120 is provided on the first end surface LS1 and the second end surface LS2 of the multilayer body 10. Furthermore, the first external electrode 41 is provided on the first lateral surface WS1, the first main surface TS1, and the second main surface TS2 of the multilayer body 10. The first external electrode 41 is in contact with the extension portion 120 at the first lateral surface WS1.

Effective Portion

First, the above-described effective portion will be described. The effective portion 110 is a portion where the first internal electrode 31 and the second internal electrode 32 are opposed to each other in the lamination direction T. In the effective portion 110, a capacitance is generated. Thus, the multilayer ceramic capacitor 1 defines and functions as a capacitor. The effective portion 110 corresponds to the counter portion described above. On the first lateral surface WS1 and the second lateral surface WS2, the first internal electrode 31 and the second internal electrode 32 are opposed to each other in the lamination direction T. The opposed portion defines and functions as the effective portion 110. The effective portion 110 is exposed at the first lateral surface WS1 and the second lateral surface. However, the positions of the exposed effective portions 110 are different between the first lateral surface WS1 and the second lateral surface WS2. On the first lateral surface WS1, the effective portion 110 is exposed at each of both end portions in the length direction L. This is because the lateral surface second notch 83W is provided at the first lateral surface WS1. On the other hand, on the second lateral surface WS2, the effective portion 110 is continuously exposed from one end to the other end in the length direction L. This is because the notch 80 is not provided at the second lateral surface WS2.

Extension Portion

The extension portion 120 refers to a portion which allows for the selective connection between the internal electrode 30 and the external electrode 40. Here, the selective connection indicates a connection in which the external electrode 40 is connected to one of the first internal electrode 31 or the second internal electrode 32, and is not connected to the other. A portion that allows for the selective connection between the first internal electrode 31 and the first external electrode 41 is referred to as a first extension portion 121. Furthermore, a portion that allows for the selective connection between the second internal electrode 32 and the second external electrode 42 is referred to as a second extension portion 122. In the multilayer ceramic capacitor 1 of a preferred embodiment of the present invention, the first extension portion 121 is provided on the first lateral surface WS1, and the second extension portion 122 is provided on the first end surface LS1 and the second end surface LS2.

Side End Portion

The side end portion refers to a portion where the internal electrode 30 is exposed on the surface of the multilayer body 10 as a result of the internal electrode 30 extending in a direction corresponding to the end surface or the lateral surface of the multilayer body 10. The portion of the effective portion 110 exposed at the end surface or lateral surface corresponds to at least a portion of the side end portion. The extension portion 120 also corresponds to at least a portion of the side end portion. The side end portion of the end surface is referred to as an end surface side end portion, and the side end portion of the lateral surface is referred to as a lateral surface side end portion.

First Extension Portion

Only the first internal electrode 31 is exposed and the second internal electrode 32 is not exposed at the first extension portion 121 provided on the first lateral surface WS1. This is because the lateral surface second notch 82W is provided at a position corresponding to the first extension portion 121 in the outer shape of the second internal electrode 32.

First External Electrode

The first external electrode 41 is in contact with the first extension portion 121 on the first lateral surface WS1. Thus, the first external electrode 41 is selectively connected to the first internal electrode 31.

Main Surface External Electrode Portion and Lateral Surface External Electrode Portion The first external electrode 41 is provided not only on the first lateral surface WS1, but also on the first main surface TS1 and the second main surface TS2. A portion of the first external electrode 41 provided on the first lateral surface WS1 is referred to as a lateral surface first external electrode portion 41W. Furthermore, a portion of the first external electrode 41 provided on the first main surface TS1 or the second main surface TS2 is referred to as a main surface first external electrode portion 41T. As shown in FIG. 5, the main surface first external electrode portion 41T of the first main surface TS1, the lateral surface first external electrode portion 41W of the first lateral surface WS1, and the main surface first external electrode portion 41T of the second main surface TS2 are continuous and together define the first external electrode 41.

First External Electrode and Side Gap Portion

The side gap portions 50 are provided over the entire first lateral surface WS1 and the second lateral surface WS2 of the multilayer body 10. In the first lateral surface WS1, the side gap portion 50 covers the first external electrode 41. Therefore, the lateral surface first external electrode portion 41W of the first external electrode 41 is covered with the side gap portion 50 and is not exposed. As a result, with regard to the first external electrode 41, only the main surface first external electrode portion 41T is exposed at the first main surface TS1 and the second main surface TS2. Furthermore, the effective portion 110 exposed at the first lateral surface WS1 and the second lateral surface WS2 is also covered with the side gap portion 50. With such a configuration, it is possible to prevent the internal electrode 30 from being exposed at the lateral surface.

Second Extension Portion

Next, the second extension portion 122 will be described. Only the second internal electrode 32 is exposed at the first end surface LS1 and the second end surface LS2, and the first internal electrode 31 is not exposed. This is because the end surface first notch 81L is provided at a position corresponding to the second extension portion 122 of the first internal electrode 31.

Second External Electrode

As shown in FIG. 1, the second external electrode 42 is provided on substantially the entire surfaces of the first end surface LS1 and the second end surface LS2 of the multilayer body 10. Thus, the second external electrode 42 is selectively connected to the second internal electrode 32. This is because only the second internal electrodes 32 are exposed at the second extension portions 122 of the first end surface LS1 and the second end surface LS2.

Advantageous Effect

In the multilayer ceramic capacitor 1 of a preferred embodiment of the present invention, the first external electrode 41 includes the lateral surface electrode portion and the main surface electrode portion. Therefore, even when the lateral surface electrode portion is covered with the side gap portion 50, it is still possible to expose the main surface electrode portion. Therefore, the multilayer ceramic capacitor 1 according to a preferred embodiment of the present invention facilitates the provision of the multilayer ceramic capacitor 1 including three or more terminals and including the side gap portion 50. Furthermore, in the multilayer ceramic capacitor 1 of a preferred embodiment of the present invention, the notch 80 is appropriately provided. Therefore, it is possible to increase the area of the effective portion 110 while securing the extension portion 120.

Modified Example

In the multilayer ceramic capacitor 1 of the first preferred embodiment, it is possible to make the configuration of the second lateral surface WS2 of the second internal electrode 32 the same as the configuration of the first lateral surface WS1. In other words, it is possible to provide the lateral surface second notch 82W at a position corresponding to the second lateral surface WS2 of the second internal electrode 32, similarly to the position corresponding to the first lateral surface WS1. In addition, the first external electrode 41 having the same configuration as the first external electrode 41 described above is provided on the first main surface TS1, the second lateral surface WS2, and the second main surface TS2. With such a configuration, it is possible to connect the first internal electrode 31 and the first external electrode 41 with each other at two positions of the first lateral surface WS1 and the second lateral surface WS2. As a result, it is possible to ensure the connection between the first internal electrode 31 and the first external electrode 41 more reliably.

Hereinafter, materials and the like of the multilayer ceramic capacitor 1 will be described.

Material for Internal Electrode

The internal electrode 30 includes metal Ni as a main component. The internal electrode 30 may include, for example, at least one selected from metals such as Cu, Ag, Pd, and Au or alloys including at least one of these metals such as Ag—Pd alloy as a main component, or may include a component other than the main component. Furthermore, the internal electrode 30 may include dielectric particles having the same composition as the ceramic contained in the dielectric layer 20 as components other than the main component. In this specification, the metal of the main component is defined as a metal component having the highest weight %.

Thickness and Number of Internal Electrodes

The thickness of the internal electrode 30 is not particularly limited, but may be, for example, about 0.8 μm or more and about 1.2 μm or less. The number of internal electrodes 30 is not particularly limited, but is preferably 20 or more and 300 or less, for example.

Material for Dielectric

As a material of the dielectric layer 20, for example, a dielectric ceramic containing $BaTiO_3$, $CaTiO_3$, $SrTiO_3$, $CaZrO_3$, or the like as a main component can be used. As a material of the dielectric layer 20, a Mn compound, an Fe compound, a Cr compound, a Co compound, a Ni compound, or the like may be added as a subcomponent.

Thickness and Material for Dielectric Layer

The thickness of the dielectric layer 20 is not particularly limited, but is preferably, for example, about 1.1 µm or more and about 3.0 µm or less. The number of dielectric layers 20 is not particularly limited, but is preferably, for example, 20 or more and 300 or less. The number of the dielectric layers 20 is a total number of the number of the dielectric layers of the inner layer portion and the number of the dielectric layers of the outer layer portion.

External Electrode

Next, the external electrode 40 will be described. As a material of the external electrode 40, for example, in a case where the external electrode 40 is formed by cofiring, an electrically conductive material containing Ni can be used as in the case of the internal electrode 30. The external electrode 40 may include a plating layer as necessary.

Material for Side Gap Portion

Examples of the material of the side gap portion 50 include a dielectric ceramic material having a perovskite structure made of a main component such as $BaTiO_3$. Si is added as an additive to these main components, and a portion in which these additives segregate exists between the ceramic particles. The presence of the segregated portion of Si improves the bending strength of the side gap portion 50. Si is added in the outer side gap layer 502 such that the number of moles of Si/the number of moles of Ti is about 3.0 or more and about 7.0 or less, for example. On the other hand, in the inner side gap layer 501, Si is added such that the number of moles of Si/the number of moles of Ti is about 1.0 or more and about 4.0 or less, for example. In particular, the segregation portion of Si in the outer side gap layer 502 is more than the segregation portion of Si in the inner side gap layer 501.

Thickness of Side Gap Portion

The dimension of the side gap portion 50 in the width (W) direction, i.e., the thickness, may be, for example, about 5 µm or more and about 40 µm or less. The thickness is preferably 20 µm or less. The thickness of the outer side gap layer 502 is larger than the thickness of the inner side gap layer 501. More specifically, the thickness of the outer side gap layer 502 is about 5 µm or more and about 20 µm or less. On the other hand, the thickness of the inner side gap layer 501 is about 0.1 µm or more and about 20 µm or less.

Method of Measuring Thickness

Next, the measuring method will be described. Examples of a method of measuring the thicknesses of the dielectric layer 20 and the internal electrodes 30 include a method of observing an LT cross section in the vicinity of the center in the width direction of the multilayer body exposed by polishing with a scanning electron microscope. Furthermore, each value may be an average value of measurement values at a plurality of positions in the length direction, or may be an average value of measurement values at a plurality of positions in the lamination direction. Similarly, examples of a method of measuring the thickness of the multilayer body 10 include a method of observing an LT cross section in the vicinity of the center in the width direction of the multilayer body exposed by polishing or a WT cross section in the vicinity of the center in the length direction of the multilayer body exposed by polishing with a scanning electron microscope. Furthermore, each value may be an average value of measurement values at a plurality of positions in the length direction or the width direction.

Method of Measuring Length

Similarly, examples of a method of measuring the length of the multilayer body 10 include a method of observing an LT cross section in the vicinity of the center in the width direction of the multilayer body exposed by polishing with a scanning electron microscope. Furthermore, each value may be an average value of measurement values at a plurality of positions in the lamination direction. Similarly, examples of a method of measuring the width of the multilayer body 10 include a method of observing a WT cross section in the vicinity of the center in the length direction of the multilayer body exposed by polishing with a scanning electron microscope. Furthermore, each value may be an average value of measurement values at a plurality of positions in the lamination direction.

Next, a non-limiting example of a method of manufacturing the multilayer ceramic capacitor 1 of a preferred embodiment of the present invention will be described. In the following description, a general manufacturing method of the multilayer ceramic capacitor 1 will be described by way of example. First, a dielectric sheet for the dielectric layer 20 and an electrically conductive paste for the internal electrodes 30 are provided. The dielectric sheet and the electrically conductive paste include a binder and a solvent. As the binder and the solvent, well-known materials can be used. Next, an internal electrode pattern is formed on the dielectric sheet by printing an electrically conductive paste on the dielectric sheet in a predetermined pattern, for example. As a method of forming the internal electrode pattern, screen printing, gravure printing, or the like can be used. At this time, if necessary, the internal electrode pattern includes a pattern corresponding to the notch 80. Next, a predetermined number of dielectric sheets for the second outer layer portion 102 on which no internal electrode pattern is printed are laminated. A dielectric sheet for the inner layer portion 100 on which the internal electrode pattern is printed is sequentially laminated thereon. The dielectric sheet includes a dielectric sheet corresponding to the first dielectric layer 21, a dielectric sheet corresponding to an inter-effective portion dielectric layer 23, and a dielectric sheet corresponding to a second dielectric layer 22. A predetermined number of dielectric sheets for the first outer layer portion 101 on which no internal electrode pattern is printed are laminated thereon. Thus, a multilayer body sheet is produced.

Press

Next, the multilayer body sheet is pressed in the lamination direction via hydrostatic pressing, for example, to prepare a multilayer body block. Next, the multilayer body block is cut to a predetermined size, so that the multilayer body chip is cut out. At this time, the corner portions and ridge portions of the multilayer body chip are rounded by barrel polishing or the like.

External Electrode

Next, an electrically conductive paste material functioning as an external electrode is provided at a desired position of the multilayer body 10. The electrically conductive paste material can be provided by a coating method, a printing method, or the like. The electrically conductive paste material contains Ni or the like as in the internal electrode material.

Side Gap Portion

Next, the material of the side gap portion 50 is provided on the first lateral surface WS1 and the second lateral surface WS2 of the multilayer body 10. Thus, a fired precursor is obtained.

Firing

Next, the fired precursor is fired. The firing temperature is preferably about 900° C. or higher and about 1400° C. or lower, for example, although it depends on the material of the dielectric and the electrode. Through the above steps, the multilayer ceramic capacitor 1 is obtained.

Hereinafter, other preferred embodiments of the preferred embodiment of the present invention will be described. In each preferred embodiment, the manner in which the internal electrode 30 and the external electrode 40 are connected is mainly different. The following description focuses on differences from the multilayer ceramic capacitor 1 of the first preferred embodiment.

Second Preferred Embodiment

The second preferred embodiment will be described with reference to FIGS. 7A to 10.

Difference Between Second Preferred Embodiment and First Preferred Embodiment

The main difference between the second preferred embodiment and the first preferred embodiment is as follows. In the first preferred embodiment, the first internal electrode 31 and the first external electrode 41 are connected to each other at one position at the first lateral surface WS1, and the second internal electrode 32 and the second external electrode 42 are connected at two positions at the first end surface LS1 and the second end surface LS2. On the other hand, in the second preferred embodiment, the first internal electrode 31 and the first external electrode 41 are connected to each other at a total of three positions, i.e., two positions at the first lateral surface WS1 and one position at the second lateral surface WS2, and the second internal electrode 32 and the second external electrode 42 are connected to each other at a total of three positions, i.e., one position at the first lateral surface WS1 and two positions at the second lateral surface WS2. In the second preferred embodiment, the number of portions where the internal electrode 30 and the external electrode 40 are connected is larger than that in the first preferred embodiment. Furthermore, in the second preferred embodiment, the internal electrode 30 and the external electrode 40 are connected only at the lateral surface and not at the end surface.

Internal Electrode

In order to connect the internal electrode 30 and the external electrode 40 as described above, the shape of the internal electrode 30 in the second preferred embodiment is different from the shape of the internal electrode 30 in the first preferred embodiment.

Figure 7A:
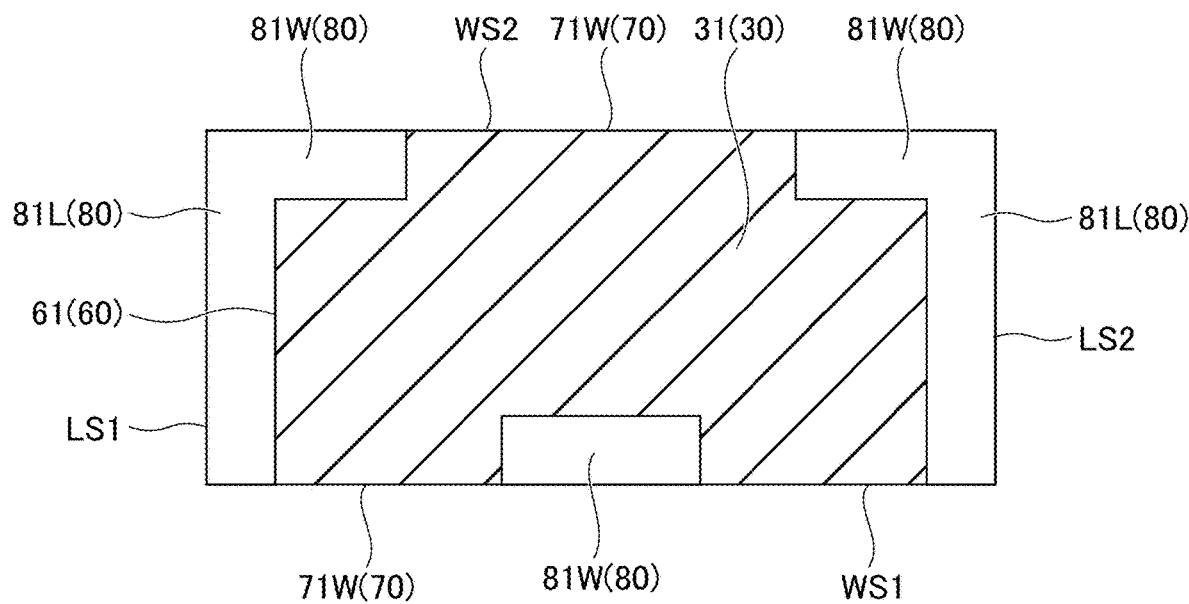
FIGS. 7A and 7B are diagrams showing an internal electrode of a second preferred embodiment of the present invention, with FIG. 7A showing a first internal electrode in a plan view and FIG. 7B showing a second internal electrode in a plan view.

The first internal electrode 31 will be described with reference to FIG. 7A. First, the end surface will be described.

Notches at End Surface of First Internal Electrode

The outer shape of the first internal electrode 31 includes a total of two end surface first notches 81L, one of which is located at a position corresponding to the first end surface LS1 and the other of which is located at a position corresponding to the second end surface LS2. The end surface first notches 81L extend from one end to the other end at a position corresponding to the first end surface LS1 and a position corresponding to the second end surface LS2, respectively. Furthermore, the first internal electrode 31 does not include the extension electrode portion 70 at a position corresponding to the first end surface LS1 and a position corresponding to the second end surface LS2. This is because the end surface first notches 81L extend from one end to the other end at a position corresponding to the first end surface LS1 and at a position corresponding to the second end surface LS2, respectively.

Next, the lateral surface will be described.

Notch at First Lateral Surface of First Internal Electrode

The outer shape of the first internal electrode 31 includes a lateral surface first notch 81W at a center portion at a position corresponding to the first lateral surface WS1.

Extension Electrode Portion at First Lateral Surface of First Internal Electrode The first internal electrode 31 includes a total of two side surface first extension electrode portions 71W at both end portions at positions corresponding to the first lateral surface WS1. This is because lateral surface second notches 82W are provided at both end portions of the second internal electrode 32 at positions corresponding to the first lateral surface WS1, as described later. One of the lateral surface-first extension electrode portions 71W is provided between the end surface first notch 81L adjacent to the first end surface LS1 and the lateral surface first notch 81W, and the other one of the lateral surface-first extension electrode portion 71W is provided between the lateral surface first notch 81W and the end surface first notch 81L adjacent to the second end surface LS2.

Notches at Second Lateral Surface of First Internal Electrode

Furthermore, the outer shape of the first internal electrode 31 includes a total of two lateral surface first notches 81W at both end portions at positions corresponding to the second lateral surface WS2, respectively.

Extension Electrode Portion at Second Lateral Surface of First Internal Electrode The first internal electrode 31 includes the lateral surface first extension electrode portion 71W at a center portion at a position corresponding to the second lateral surface WS2. This is because, as described later, the lateral surface second notch 82W is provided at the center portion at a position corresponding to the second lateral surface WS2 of the second internal electrode 32. The lateral surface-first extension electrode portion 71W is sandwiched by the lateral surface first notches 81W at a position corresponding to the second lateral surface WS2.

The configuration of the end surface and the lateral surface of the first internal electrode 31 of the second preferred embodiment will be summarized.

Arrangement Order at End Surface

In the first internal electrode 31, the end surface first notch 81L extends from one end to the other end at a position corresponding to the first end surface LS1 and a position corresponding to the second end surface LS2. Therefore, the first extension electrode portion 71 is not provided at a position corresponding to the first end surface LS1 and a position corresponding to the second end surface LS2.

Arrangement Order at Lateral Surface

In the first internal electrode 31, the end surface first notch 81L, the lateral surface first extension electrode portion 71W, the lateral surface first notch 81W, the lateral surface first extension electrode portion 71W, and the end surface first notch 81L are provided in this order from one end to the other end at a position corresponding to the first lateral surface WS1. On the other hand, in the second internal electrode 32, the end surface first notch 81L, the lateral surface first notch 81W, the lateral surface-first extension electrode portion 71W, the lateral surface first notch 81W, and the end surface first notch 81L are provided in this order from one end to the other end at a position corresponding to the first lateral surface WS1.

Figure 7B:
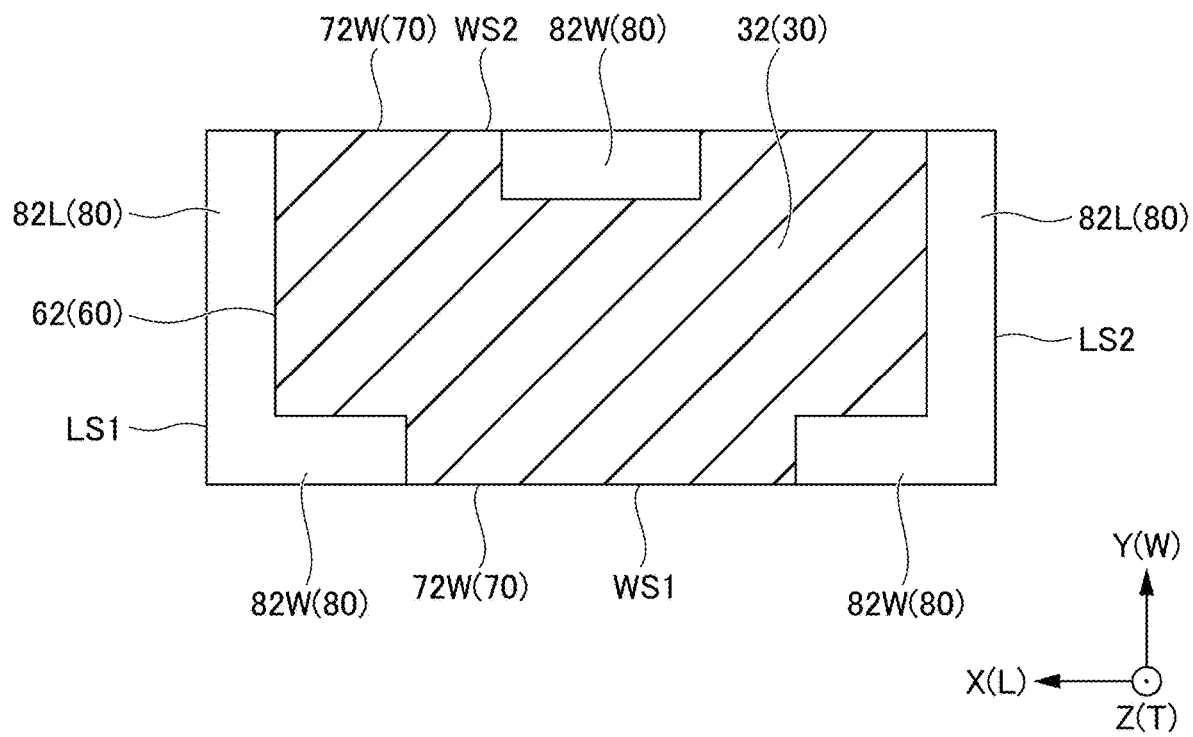
Figure 8:
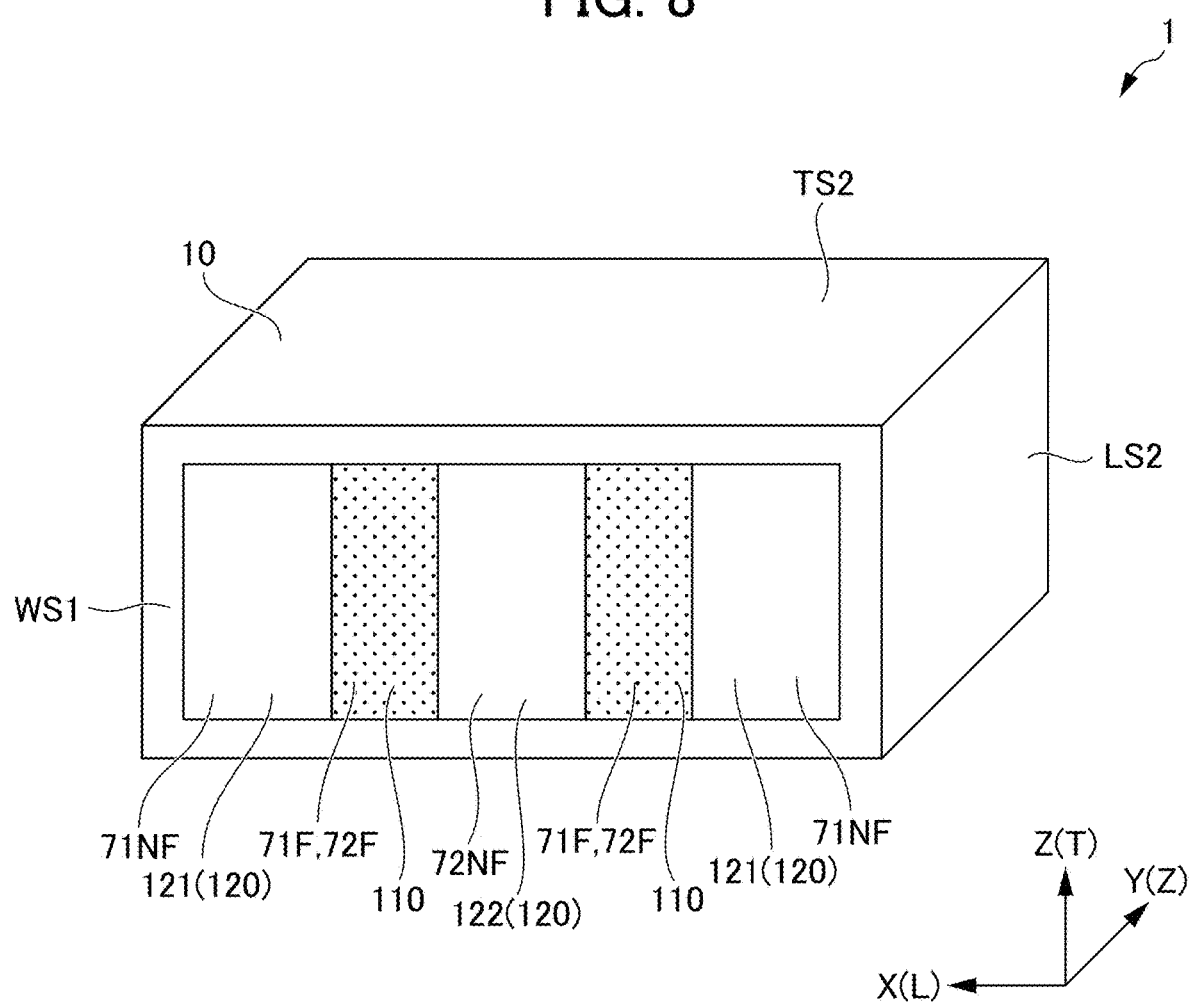
FIG. 8 is a perspective view showing a state before an external electrode and side gap portions are provided in a multilayer ceramic capacitor of the second preferred embodiment of the present invention.

Next, the second internal electrode 32 will be described with reference to FIG. 7B. First, the end surface will be described.

Notches at End Surface of Second Internal Electrode

The outer shape of the second internal electrode 32 includes a total of two end surface second notches 82L at a position corresponding to the first end surface LS1 and at a position corresponding to the second end surface LS2, respectively. The end surface second notches 82L extend from one end to the other end at positions corresponding to the second end surface LS2 and the second end surface LS2, respectively. Similarly to the first internal electrode 31, the second internal electrode 32 does not include the extension electrode portion 70 at a position corresponding to the first end surface LS1 and a position corresponding to the second end surface LS2. This is because the end surface second notches 82L extend from one end to the other end at a position corresponding to the first end surface LS1 and at a position corresponding to the second end surface LS2, respectively, as described above.

Next, the lateral surface will be described.

Notches at First Lateral Surface of Second Internal Electrode

The outer shape of the second internal electrode 32 includes a total of two lateral surface second notches 82W located at both end portions at positions corresponding to the first lateral surface WS1.

Extension Electrode Portion at First Lateral Surface of Second Internal Electrode The second internal electrode 32 includes a lateral surface-second extension electrode portion 72W at a center portion at a position corresponding to the first lateral surface WS1. This is because the lateral surface first notch 81W is provided at the center portion of a position corresponding to the first lateral surface WS1 of the first internal electrode 31. The lateral surface-second extension electrode portion 72W is sandwiched by the lateral surface second notch 82W at a position corresponding to the first lateral surface WS1.

Notches at Second Lateral Surface of Second Internal Electrode

The outer shape of the second internal electrode 32 includes a lateral surface second notch 82W at a center portion at a position corresponding to the second lateral surface WS2.

Extension Electrode Portion at Second Lateral Surface of Second Internal Electrode The second internal electrode 32 includes a total of two lateral surface-second extension electrode portions 72W at both end portions at positions corresponding to the second lateral surface WS2. This is because the lateral surface first notches 81W are provided at both end portions of the first internal electrode 31 at positions corresponding to the second lateral surface WS2. One of the lateral surface-second extension electrode portion 72W is provided between the end surface second notch 82L adjacent to the first end surface LS1 and the lateral surface second notch 82W, and the other one of the lateral surface-second extension electrode portion 72W is provided between the lateral surface second notch 82W and the end surface second notch 82L adjacent to the second end surface LS2 side.

The configuration of the end surface and the lateral surface of the second internal electrode 32 of the second preferred embodiment will be summarized.

Arrangement Order at End Surface

In the second internal electrode 32, the end surface second notch 82L extends from one end to the other end at a position corresponding to the first end surface LS1 and a position corresponding to the second end surface LS2. Therefore, the second extension electrode portion 72 is not provided at a position corresponding to the first end surface LS1 and a position corresponding to the second end surface LS2.

Arrangement Order at Lateral Surface

In the second internal electrode 32, the end surface second notch 82L, the lateral surface second notch 82W, the lateral surface-second extension electrode portion 72W, the lateral surface second notch 82W, and the end surface second notch 82L are provided at a position corresponding to the first lateral surface WS1 in this order from one end to the other end. On the other hand, in the second internal electrode 32, the end surface second notch 82L, the lateral surface-second extension electrode portion 72W, the lateral surface second notch 82W, the lateral surface-second extension electrode portion 72W, and the end surface second notch 82L are provided at a position corresponding to the second lateral surface WS2 in this order from one end to the other end.

Extension Electrode Portion of Internal Electrode

As described above, the first internal electrode 31 includes a total of three extension electrode portions 70, two of which are located at positions corresponding to the first lateral surface WS1 and one of which is located at a position corresponding to the second lateral surface WS2. Furthermore, the second internal electrode 32 includes a total of three extension electrode portions 70, one of which is located at a position corresponding to the first lateral surface WS1 and two of which are located at positions corresponding to the second lateral surface WS2. On the other hand, the first internal electrode 31 and the second internal electrode 32 do not include the extension electrode portion 70 at a position corresponding to the first end surface LS1 and a position corresponding to the second end surface LS2. This is because the notch 80 extends from one end to the other end in both of the outer shapes of the first internal electrode 31 and the second internal electrode 32 at a position corresponding to the first end surface LS1 and at a position corresponding to the second end surface LS2.

Extension Portion

Next, the extension portion 120 will be described. The extension portion 120 is provided corresponding to the extension electrode portion 70. In the second preferred embodiment, the extension portion 120 is provided only at the first lateral surface WS1 and the second lateral surface WS2, and is not provided at the first end surface LS1 and the second end surface LS2.

Extension Portion at First Lateral Surface

At the first lateral surface WS1, a total of two first extension portions 121 are provided at positions corresponding to the lateral surface-first extension electrode portions 71W. Furthermore, one second extension portion 122 is provided at a position corresponding to the second extension electrode portion 72W.

Extension Portion at Second Lateral Surface

At the second lateral surface WS2, one first extension portion 121 is provided at a position corresponding to the lateral surface-first extension electrode portion 71W. Furthermore, a total of two second extension portions 122 are provided at positions corresponding to the lateral surface-second extension electrode portions 72W.

Effective Portion

The effective portion 110 is exposed from the first lateral surface WS1 and the second lateral surface WS2. In the vicinity of the first lateral surface WS1 and in the vicinity of the second lateral surface WS2, there is a portion where the lateral surface first extension electrode portion 71W and the lateral surface second extension electrode portion 72W overlap each other in a plan view. This portion corresponds to the first extension electrode counter portion 71F and the second extension electrode counter portion 72F. This portion functions as the effective portion 110. The effective portion 110 is exposed at the first lateral surface WS1 and the second lateral surface WS2. More specifically, a total of four effective portions 110 are exposed at the first lateral surface WS1 and the second lateral surface WS2 between the first extension portion 121 and the second extension portion 122.

Relationship Between Extension Portion and Effective Portion

As described above, the extension portion 120 is a portion that allows for the selective connection between the internal electrode 30 and the external electrode 40. On the other hand, the effective portion 110 is a portion where the first internal electrode 31 and the second internal electrode 32 are opposed to each other in the lamination direction T. Therefore, in the lateral surface, in the length direction L of the lateral surface, a portion where only the lateral surface-first extension electrode portion 71W is exposed functions as the first extension portion 121, a portion where only the lateral surface-second extension electrode portion 72W is exposed functions as the second extension portion 122, and a portion where both the lateral surface-first extension electrode portion 71W and the lateral surface-second extension electrode portion 72W are exposed function as a portion where the effective portion 110 is exposed. The portion where only the lateral surface-first extension electrode portion 71W is exposed and the portion where only the lateral surface-second extension electrode portion 72W is exposed correspond to a first extension electrode non-counter portion 71NF and a second extension electrode non-counter portion 72NF, respectively. On the other hand, the portion where both the lateral surface-first extension electrode portion 71W and the lateral surface-second extension electrode portion 72W are exposed corresponds to a first extension electrode counter portion 71F and a second extension electrode counter portion 72F.

Length and Configuration of Notch and Extension Electrode Portion

In the second preferred embodiment, the extension portion 120 and the effective portion 110 are provided by adjusting the length and the configuration of the notch 80. More specifically, at a position corresponding to the first lateral surface WS1, the length in the length direction L of the lateral surface first notch 81W of the first internal electrode 31 is shorter than the length in the length direction L of the lateral surface second extension electrode portion 72W of the second internal electrode 32, for example. Therefore, in a plan view, it is possible to provide portions where the lateral surface-first extension electrode portions 71W and the lateral surface-second extension electrode portions 72W overlap each other on both sides of the lateral surface first notch 81W in the length direction L. This portion corresponds to the first extension electrode counter portion 71F and the second extension electrode counter portion 72F. With such a configuration, it is possible to provide the first extension portion 121, the effective portion 110, the second extension portion 122, the effective portion 110, and the first extension portion 121 in this order in the length direction L at the first lateral surface WS1 of the multilayer body 10. The same applies to the second lateral surface WS2 of the multilayer body 10. In the second lateral surface WS2, the combination of the extension electrode portion 70 and the notch 80 is reversed from the combination in the first lateral surface WS1. In other words, in the second lateral surface WS2 of the multilayer body 10, the second extension portion 122, the effective portion 110, the first extension portion 121, the effective portion 110, and the second extension portion 122 are provided in this order in the length direction L.

External Electrode

Figure 9:
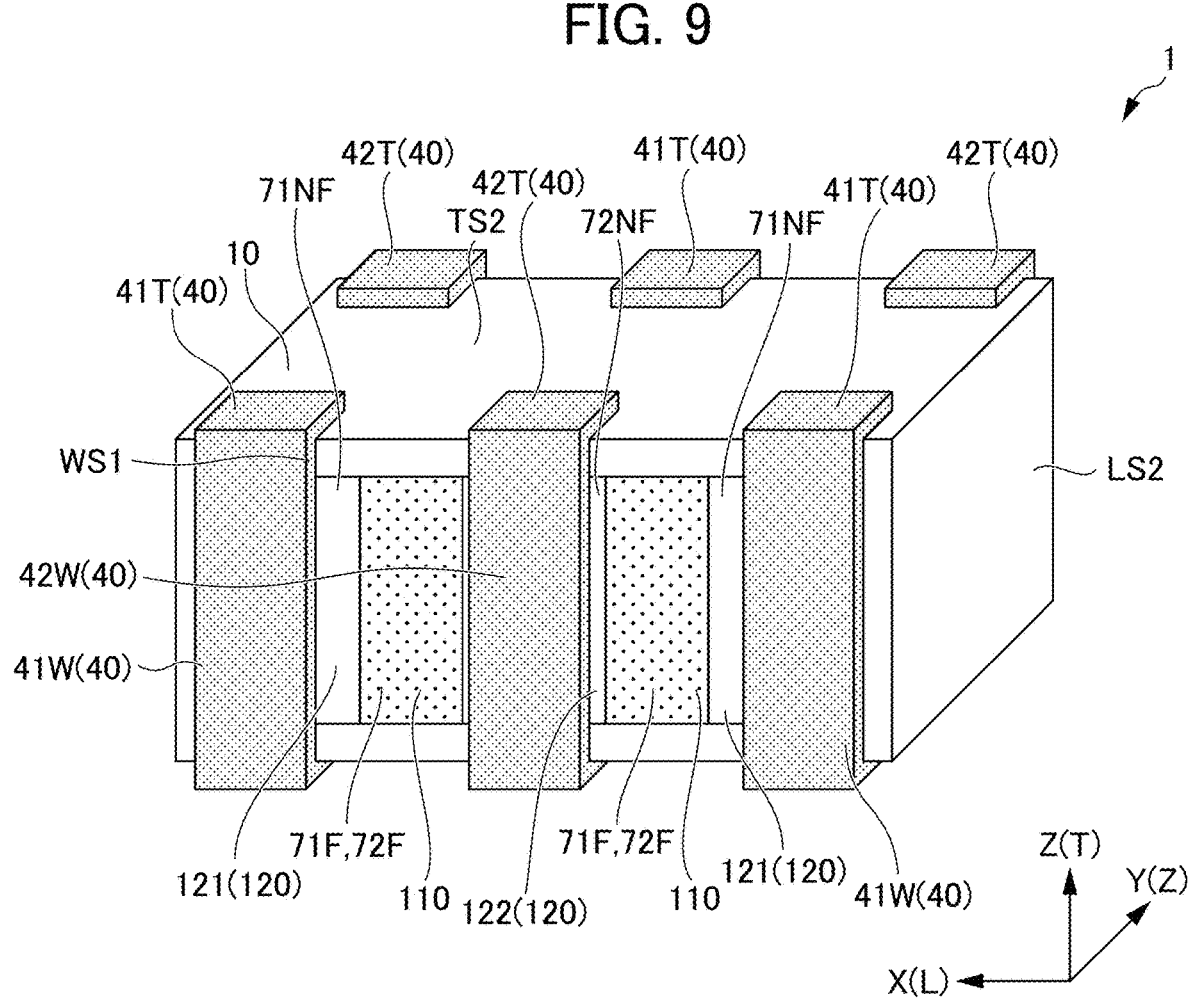
FIG. 9 is a perspective view showing a state before side gap portions are provided in the multilayer ceramic capacitor of the second preferred embodiment of the present invention.

The external electrode 40 will be described with reference to FIG. 9. The external electrode 40 is in contact with the extension portion 120. The configuration of the external electrode 40 is the same as the configuration of the first external electrode 41 of the first preferred embodiment. That is, the external electrodes 40 each include main surface external electrode portions and a lateral surface external electrode portion.

First External Electrode

First external electrodes 41 are each provided at a position corresponding to the first extension portion 121. More specifically, the first external electrodes 41 are provided at both end portions of the first lateral surface WS1 in the length direction L to contact the respective first extension portions 121. Furthermore, the first external electrode is also provided in contact with the first extension portion 121 at the center portion of the second lateral surface WS2 in the length direction L.

Second External Electrode

The second external electrode 42 is provided at a position corresponding to the second extension portion 122. More specifically, the second external electrode 42 is provided at the center portion of the first lateral surface WS1 in the length direction L, and is in contact with the second extension portion 122. Furthermore, the second external electrode is also provided in contact with the second extension portion 122 at both end portions of the second lateral surface WS2 in the length direction L.

Main Surface External Electrode Portion

The first external electrodes 41 and the second external electrode 42 are provided on the first main surface TS1 and the second main surface TS2 in addition to the first lateral surface WS1 and the second lateral surface WS2 described above. That is, each of the first external electrodes 41 includes one lateral surface first external electrode portion 41W and two main surface first external electrode portions 41T continuous with the lateral surface first external electrode portion 41W. Similarly, each of the second external electrodes 42 includes one lateral surface second external electrode portion 42W and two main surface second external electrode portions 42T continuous with the lateral surface second external electrode portion 42W. In addition, corresponding to the configuration of the respective extension portions 120, the main surface first external electrode portions 41T and the main surface second external electrode portions 42T are opposed to each other in the width direction W at each main surface.

Side Gap Portion

Figure 10:
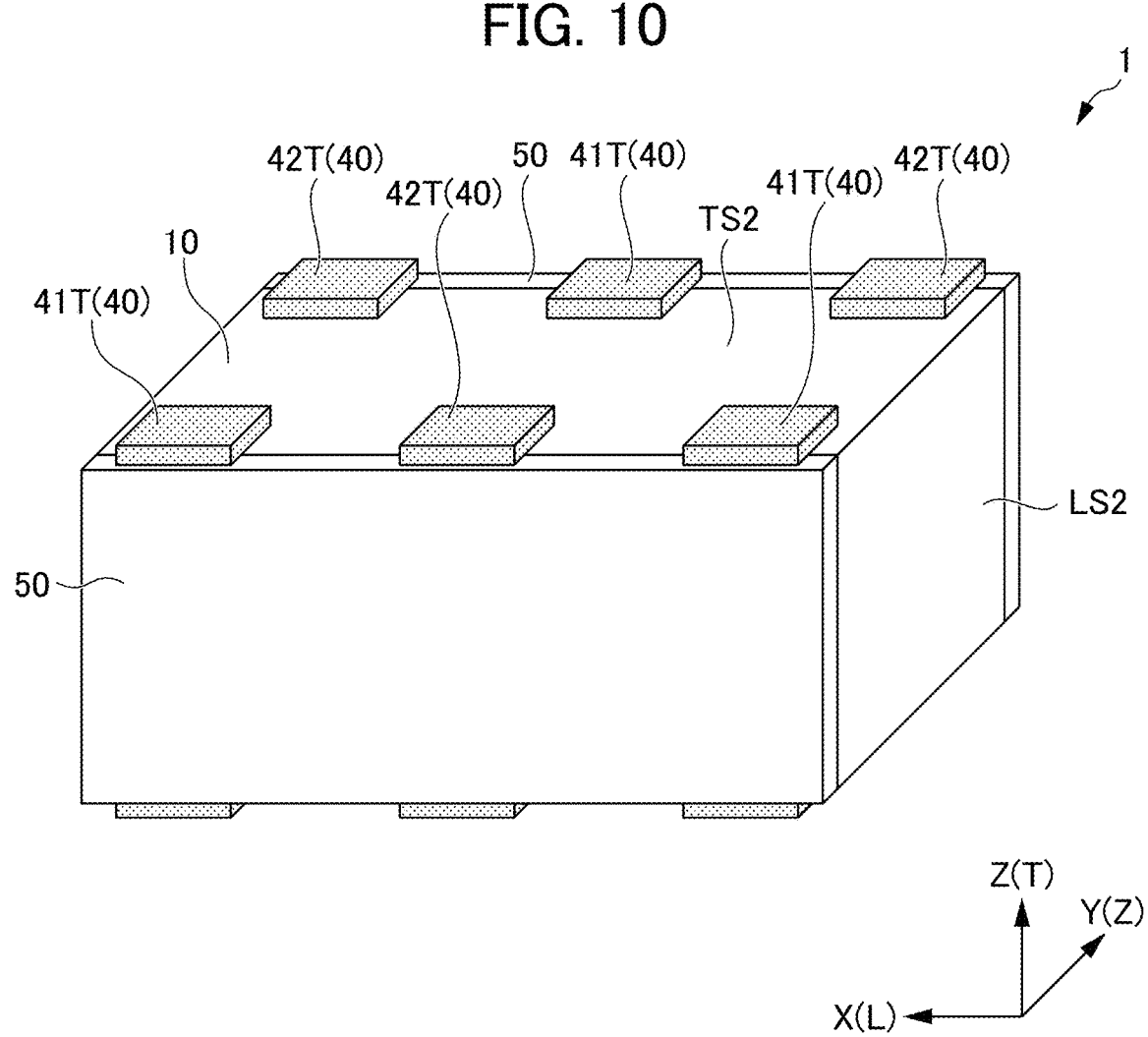
FIG. 10 is a perspective view showing a multilayer ceramic capacitor according to the second preferred embodiment of the present invention.

The side gap portion 50 will be described with reference to FIG. 10. The side gap portions 50 are provided on the first lateral surface WS1 and the second lateral surface WS2 of the multilayer body 10. The side gap portions 50 each cover the first external electrode 41 and the second external electrode 42. Therefore, the lateral surface first external electrode portion 41W of the first external electrode 41 is covered with the side gap portion 50 and is not exposed. As a result, in the first external electrode 41, only the main surface first external electrode portions 41T are exposed at the first main surface TS1 and the second main surface TS2. The same applies to the second external electrode 42. The lateral surface second external electrode portion 42W of the second external electrode 42 is covered with the side gap portion 50 and is not exposed. As a result, in the second external electrode 42, only the main surface second external electrode portion 42T is exposed at the first main surface TS1 and the second main surface TS2.

Advantageous Effect of Second Preferred Embodiment

According to the multilayer ceramic capacitor 1 of the second preferred embodiment, it is possible to easily provide the multi-terminal multilayer ceramic capacitor 1 including the side gap portions 50 and allowing for external connection only via the main surface without using the lateral surface and the end surface. Furthermore, according to the multilayer ceramic capacitor 1 of the second preferred embodiment, it is possible to provide a portion where the lateral surface-first extension electrode portion 71W and the lateral surface-second extension electrode portion 72W overlap each other in the vicinity of the first lateral surface WS1 and the vicinity of the second lateral surface WS2. Therefore, it is possible to increase the area of the effective portion 110 while securing the extension portion 120.

Third Preferred Embodiment

A third preferred embodiment of the present invention will be described with reference to FIGS. 11A to 14. In the following description, differences from the multilayer ceramic capacitor 1 according to the first preferred embodiment and the second preferred embodiment will be mainly described.

Difference Between Third Preferred Embodiment and First Preferred Embodiment

The main difference between the third preferred embodiment and the first preferred embodiment is as follows. In the first preferred embodiment, the first internal electrode 31 and the first external electrode 41 are connected to each other at one position of the first lateral surface WS1, and the second internal electrode 32 and the second external electrode 42 are connected to each other at two positions of the first end surface LS1 and the second end surface LS2. On the other hand, in the third preferred embodiment, the first internal electrode 31 and the first external electrode 41 are connected to each other at a total of two positions, one of which is located at the first lateral surface WS1 and the other of which is located at the second lateral surface WS2, and the second internal electrode 32 and the second external electrode 42 are connected to each other at a total of two points, one of which is located at the first lateral surface WS1 and the other of which is located at the second lateral surface WS2.

Internal Electrode

In order to connect the internal electrode 30 and the external electrode 40 as described above, the shape of the internal electrode 30 in the third preferred embodiment is different from the shape of the internal electrode 30 in the first preferred embodiment.

Figure 11A:
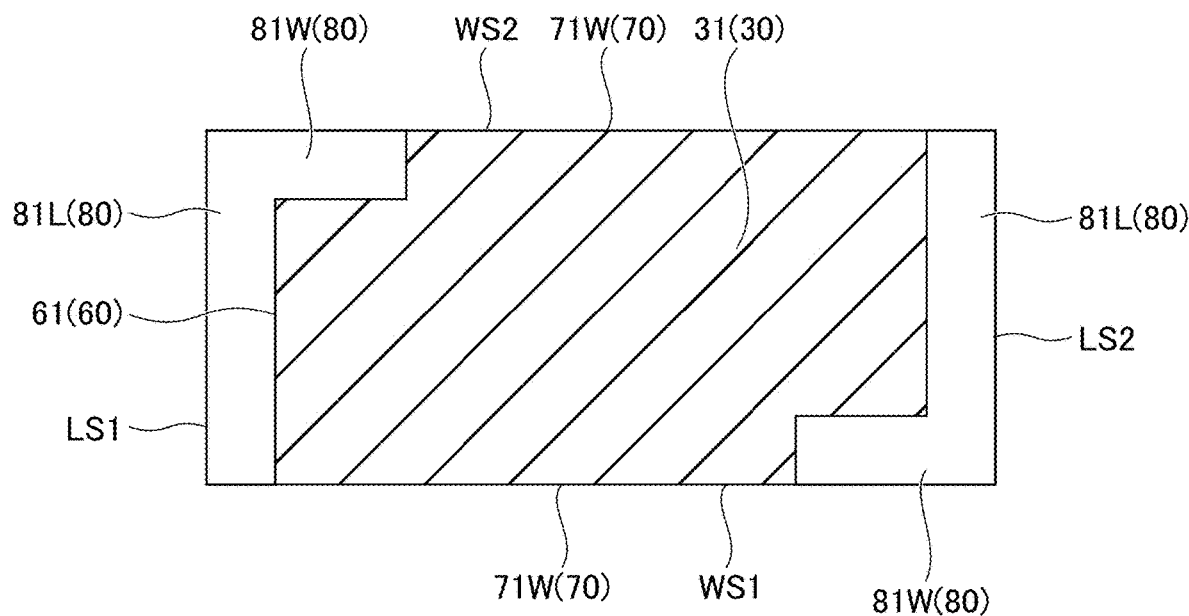
FIGS. 11A and 11B are diagrams showing an internal electrode of a third preferred embodiment of the present invention, with FIG. 11A showing a first internal electrode in a plan view, and FIG. 11B showing a second internal electrode in a plan view.

The first internal electrode 31 will be described with reference to FIG. 11A. First, the end surface will be described.

Notch at End surface of First Internal Electrode

The outer shape of the first internal electrode 31 includes a total of two end surface first notches 81L at a position corresponding to the first end surface LS1 and a position corresponding to the second end surface LS2. The end surface first notches 81L extend from one end to the other end at a position corresponding to the first end surface LS1 and a position corresponding to the second end surface LS2, respectively. Furthermore, the first internal electrode 31 does not include the extension electrode portion 70 at a position corresponding to the first end surface LS1 and a position corresponding to the second end surface LS2. This is because the end surface first notches 81L extend from one end to the other end at a position corresponding to the first end surface LS1 and at a position corresponding to the second end surface LS2, respectively, as described above.

Next, the lateral surface will be described.

Notch at First Lateral Surface of First Internal Electrode

The outer shape of the first internal electrode 31 includes a lateral surface first notch 81W at one end portion at a position corresponding to the first lateral surface WS1. More specifically, the lateral surface-first notch portion 81W is provided at an end portion adjacent to the second end surface LS2 at a position corresponding to the first lateral surface WS1.

Extension Electrode Portion at First Lateral Surface of First Internal Electrode The first internal electrode 31 includes a lateral surface-first extension electrode portion 71W at one end portion and a center portion at a position corresponding to the first lateral surface WS1. This is because the lateral surface second notch 82W is provided at one end portion and the center portion at the position corresponding to the first lateral surface WS1 of the second internal electrode 32, as described later. The lateral surface-first extension electrode portion 71W extends from an end portion adjacent to the first end surface LS1 to the center portion at a position corresponding to the first lateral surface WS1.

Notch at Second Lateral Surface of First Internal Electrode

The outer shape of the first internal electrode 31 includes the lateral surface first notch 81W at one end portion at a position corresponding to the second lateral surface WS2. More specifically, the lateral surface first notch portion 81W is provided at an end portion adjacent to the first end surface LS1 at a position corresponding to the second lateral surface WS2.

Extension Electrode Portion at Second Lateral Surface of First Internal Electrode The first internal electrode 31 includes a lateral surface-first extension electrode portion 71W at one end portion and a center portion at a position corresponding to the second lateral surface WS2. This is because the lateral surface second notch 82W is provided at the one end portion and the center portion of the position corresponding to the second lateral surface WS2 of the second internal electrode 32, as described later. The lateral surface-first extension electrode portion 71W extends from an end portion adjacent to the second end surface LS2 to the center at a position corresponding to the second lateral surface WS2. Here, the lateral surface first notch 81W adjacent to the first lateral surface WS1 and the lateral surface first notch 81W adjacent to the second lateral surface WS2 are provided at diagonal positions in the multilayer body 10. Similarly, the lateral surface-first extension electrode portion 71W adjacent to the first lateral surface WS1 and the lateral surface-first extension electrode portion 71W adjacent to the second lateral surface WS2 are provided at diagonal positions in the multilayer body 10.

The configuration of the end surface and the lateral surface of the first internal electrode 31 of the third preferred embodiment will be summarized.

Arrangement Order at End Surface

In the first internal electrode 31, the end surface first notches 81L extend from one end to the other end at a position corresponding to the first end surface LS1 and a position corresponding to the second end surface LS2, respectively. Therefore, the first extension electrode portion 71 is not provided at a position corresponding to the first end surface LS1 and a position corresponding to the second end surface LS2.

Arrangement Order at Lateral Surface

In the first internal electrode 31, the end surface first notch 81L, the lateral surface-first extension electrode portion 71W, the lateral surface first notch 81W, and the end surface first notch 81L are provided at a position corresponding to the first lateral surface WS1 in this order from one end to the other end. On the other hand, in the second internal electrode 32, the end surface first notch 81L, the lateral surface first notch 81W, the lateral surface first extension electrode portion 71W, and the end surface first notch 81L are provided at a position corresponding to the first lateral surface WS1 in this order from one end to the other end.

Figure 11B:
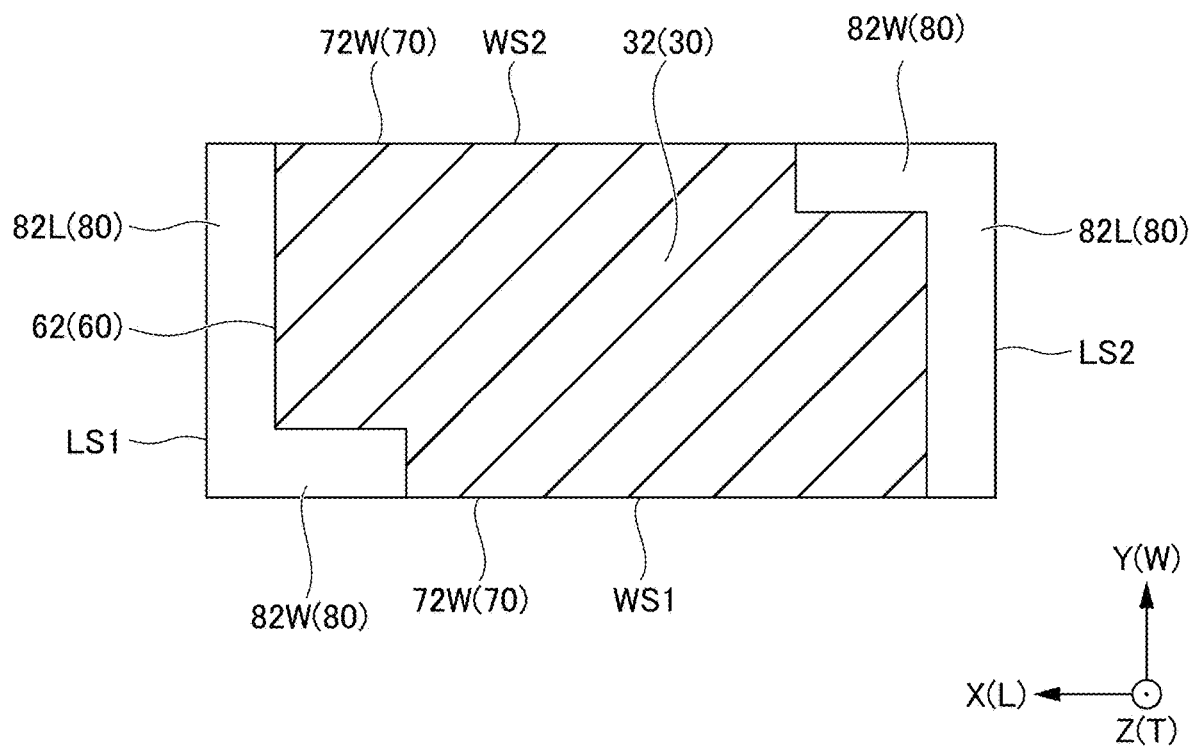
Figure 12:
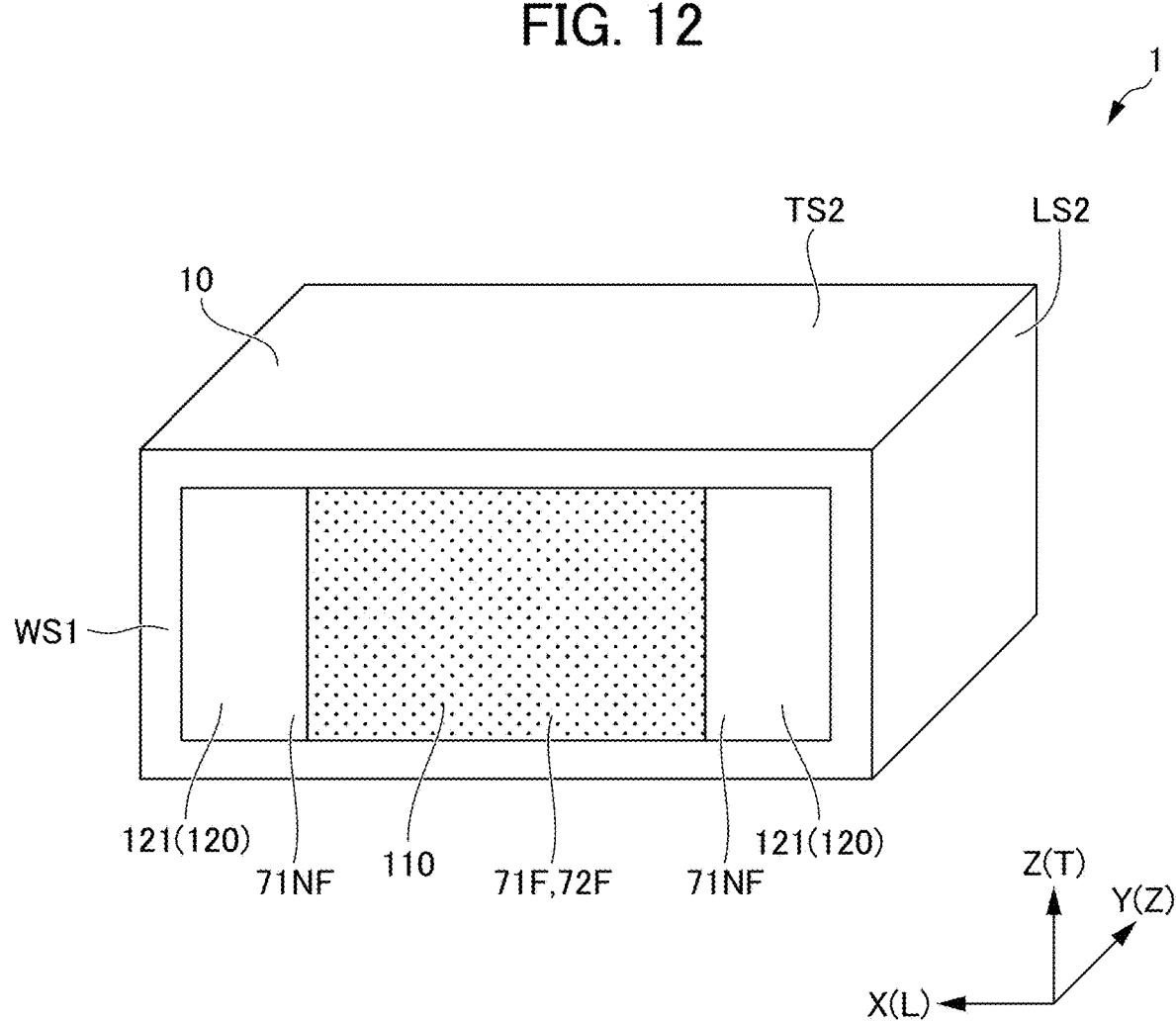
FIG. 12 is a perspective view showing a state before an external electrode and side gap portions are provided in a multilayer ceramic capacitor of the third preferred embodiment of the present invention.

Next, the second internal electrode 32 will be described with reference to FIG. 11B. First, the end surface will be described.

Notch at End Surface of Second Internal Electrode

The outer shape of the second internal electrode 32 includes a total of two end surface second notches 82L at a position corresponding to the first end surface LS1 and a position corresponding to the second end surface LS2. The second notches 82L extend from one end to the other end at a position corresponding to the first end surface LS1 and a position corresponding to the second end surface LS2, respectively. Furthermore, the second internal electrode 32 does not include the extension electrode portion 70 at a position corresponding to the first end surface LS1 and a position corresponding to the second end surface LS2. This is because the end surface second notches 82L extend from one end to the other end at a position corresponding to the first end surface LS1 and at a position corresponding to the second end surface LS2, respectively, as described above.

Next, the lateral surface will be described.

Notch at First Lateral Surface of Second Internal Electrode

The outer shape of the second internal electrode 32 includes a lateral surface second notch 82W at one end portion at a position corresponding to the first lateral surface WS1. More specifically, the lateral surface second notch 82W is provided at an end portion adjacent to the first end surface LS1 at a position corresponding to the first lateral surface WS1.

Extension Electrode Portion at First Lateral Surface of Second Internal Electrode The second internal electrode 32 includes a lateral surface-second extension electrode portion 72W at one end portion and a center portion at a position corresponding to the first lateral surface WS1. This is because the lateral surface first notch 81W is provided at one end portion and the center portion at the position corresponding to the first lateral surface WS1 of the first internal electrode 31. The lateral surface-second extension electrode portion 72W extends from an end portion adjacent to the second end surface LS2 to the center portion at a position corresponding to the first lateral surface WS1.

Notch at Second Lateral Surface of Second Internal Electrode

The outer shape of the second internal electrode 32 includes the lateral surface second notch 82W at one end portion at a position corresponding to the second lateral surface WS2. More specifically, the lateral surface second notch 82W is provided at an end portion adjacent to the second end surface LS2 at a position corresponding to the second lateral surface WS2.

Extension Electrode Portion at Second Lateral Surface of Second Internal Electrode The second internal electrode 32 includes a lateral surface-second extension electrode portion 72W at one end portion and a center portion at a position corresponding to the second lateral surface WS2. This is because the lateral surface first notch 81W is provided at the one end portion and the center portion of the position corresponding to the second lateral surface WS2 of the first internal electrode 31. The lateral surface-second extension electrode portion 72W extends from an end portion adjacent to the first end surface LS1 to the center portion at a position corresponding to the second lateral surface WS2. Here, the lateral surface second notch 82W adjacent to the first lateral surface WS1 and the lateral surface second notch 82W adjacent to the second lateral surface WS2 are provided at diagonal positions in the multilayer body 10. Similarly, the lateral surface-second extension electrode portion 72W adjacent to the first lateral surface WS1 and the lateral surface-second extension electrode portion 72W adjacent to the second lateral surface WS2 are provided at diagonal positions in the multilayer body 10.

The configuration of the end surface and the lateral surface of the second internal electrode 32 of the third preferred embodiment will be summarized.

Arrangement Order at End Surface

In the second internal electrode 32, the end surface second notches 82L extend from one end to the other end at a position corresponding to the first end surface LS1 and a position corresponding to the second end surface LS2. Therefore, the second extension electrode portion 72 is not provided at a position corresponding to the first end surface LS1 and a position corresponding to the second end surface LS2.

Arrangement Order at Lateral Surface

In the second internal electrode 32, the end surface second notch 82L, the lateral surface second notch 82W, the lateral surface second extension electrode portion 72W, and the end surface second notch 82L are provided at a position corresponding to the first lateral surface WS1 in this order from one end to the other end. On the other hand, in the second internal electrode 32, the end surface second notch 82L, the lateral surface second extension electrode portion 72W, the lateral surface second notch 82W, and the end surface second notch 82L are provided at a position corresponding to the second lateral surface WS2 in this order from one end to the other end.

Extension Electrode Portion of Internal Electrodes

As described above, the first internal electrode 31 includes a total of two extension electrode portions 70, one of which is located at a position corresponding to the first lateral surface WS1 and the other of which is located at a position corresponding to the second lateral surface WS2. Furthermore, the second internal electrode 32 includes a total of two extension electrode portions 70, one of which is located at a position corresponding to the first lateral surface WS1 and the other of which is located at a position corresponding to the second lateral surface WS2. On the other hand, the first internal electrode 31 and the second internal electrode 32 do not include the extension electrode portion 70 at a position corresponding to the first end surface LS1 and a position corresponding to the second end surface LS2. This is because the notch 80 extends from one end to the other end in both of the outer shapes of the first internal electrode 31 and the second internal electrode 32 at a position corresponding to the first end surface LS1 and at a position corresponding to the second end surface LS2.

Extension Portion

Next, the extension portion 120 will be described. The extension portion 120 is provided corresponding to the extension electrode portion 70. In the second preferred embodiment, the extension portion 120 is provided only at the first lateral surface WS1 and the second lateral surface WS2, and is not provided at the first end surface LS1 and the second end surface LS2.

Extension Portion at First Lateral Surface

At the first lateral surface WS1, a total of two first extension portions 121 are provided at positions corresponding to the lateral surface-first extension electrode portions 71W. Furthermore, one second extension portion 122 is provided at a position corresponding to the second extension electrode portion 72W.

Extension Portion at Second Lateral Surface

At the second lateral surface WS2, one first extension portion 121 is provided at a position corresponding to the lateral surface-first extension electrode portion 71W. Furthermore, one second extension portion 122 is provided at a position corresponding to the lateral surface-second extension electrode portions 72W.

Effective Portion

The effective portion 110 is exposed from the first lateral surface WS1 and the second lateral surface WS2. In the vicinity of the first lateral surface WS1 and in the vicinity of the second lateral surface WS2, there is a portion where the lateral surface first extension electrode portion 71W and the lateral surface second extension electrode portion 72W overlap each other in a plan view. This portion corresponds to the first extension electrode counter portion 71F and the second extension electrode counter portion 72F. This portion functions as the effective portion 110. The effective portion 110 is exposed at the first lateral surface WS1 and the second lateral surface WS2. More specifically, the effective portion 110 is exposed at the center portion in the length direction L at each of the first lateral surface WS1 and the second lateral surface WS2.

Length and Configuration of Notch and Extension Electrode Portion

In the third preferred embodiment, each extension electrode portion 70 extends to the center portion in the length direction L at a position corresponding to each lateral surface. Therefore, it is possible to provide a portion where the lateral surface-first extension electrode portion 71W and the lateral surface-second extension electrode portion 72W overlap each other at the center portion. This portion corresponds to the first extension electrode counter portion 71F and the second extension electrode counter portion 72F. Furthermore, in the third preferred embodiment, the lateral surface first notches 81W and the lateral surface second notches 82W are provided at different end portions in the length direction L at a position corresponding to the first lateral surface WS1 and a position corresponding to the second lateral surface WS2, respectively. Therefore, it is possible to provide the first extension portion 121 or the second extension portion 122 at both end portions in the length direction L of the first lateral surface WS1 and the second lateral surface WS2. These portions correspond to a first extension electrode non-counter portion 71NF and a second extension electrode non-counter portion 72NF. With such a configuration, it is possible to provide the first extension portion 121, the effective portion 110, and the first extension portion 121 in this order in the length direction L on the first lateral surface WS1 of the multilayer body 10. The same applies to the second lateral surface WS2 of the multilayer body 10. In the second lateral surface WS2, the combination of the extension electrode portion 70 and the notch 80 is reversed from the combination in the first lateral surface WS1. In other words, in the second lateral surface WS2 of the multilayer body 10, the second extension portion 122, the effective portion 110, and the first extension portion 121 are provided in this order in the length direction L which is opposite to the order in the first lateral surface WS1 of the multilayer body 10.

External Electrode

Figure 13:
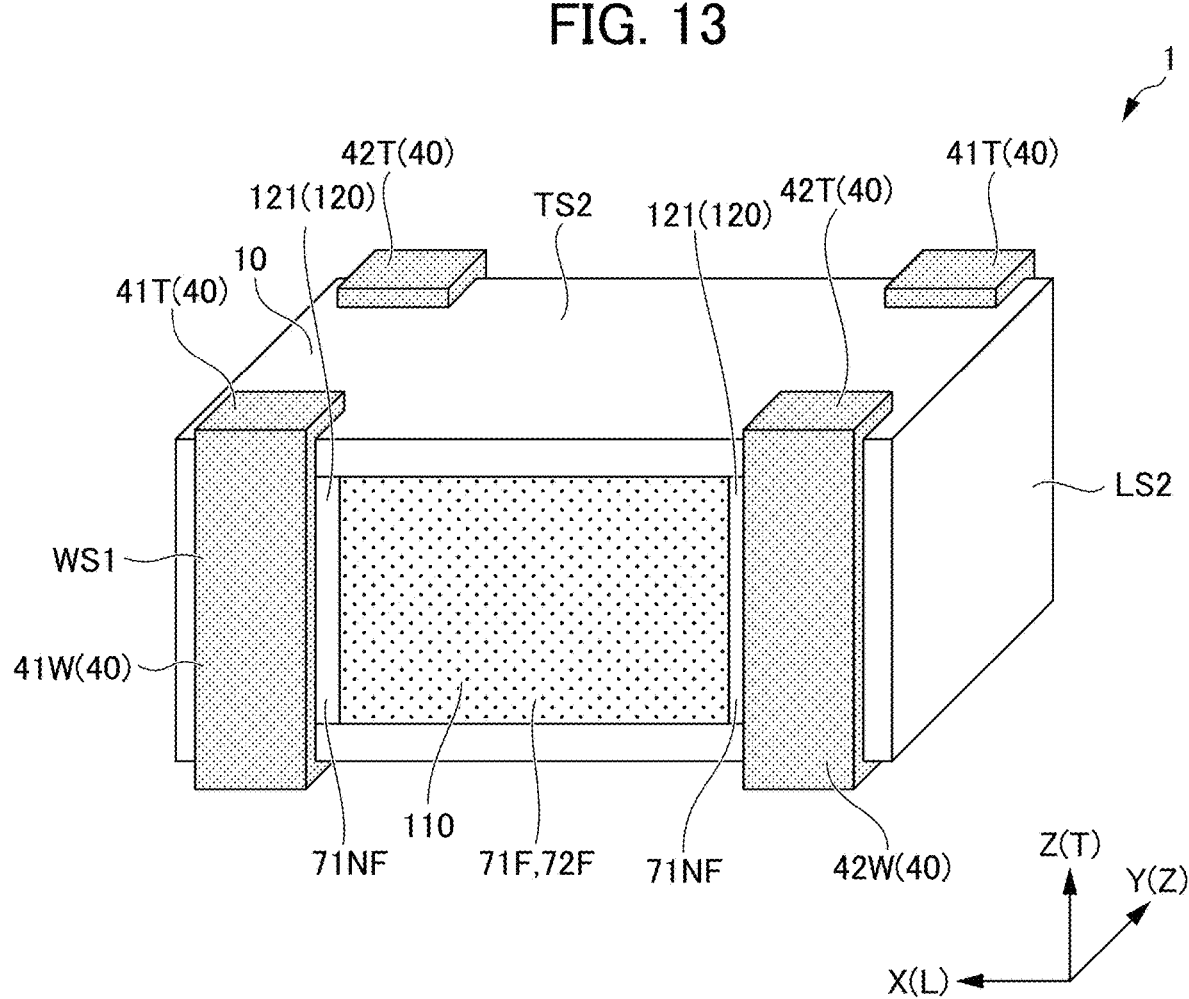
FIG. 13 is a perspective view showing a state before side gap portions are provided in the multilayer ceramic capacitor of the third preferred embodiment of the present invention.

The external electrode 40 will be described with reference to FIG. 13. The external electrode 40 is in contact with the extension portion 120. The configuration of the external electrode 40 is the same as the configuration of the first external electrode 41 of the first preferred embodiment. That is, the external electrodes 40 each include main surface external electrode portions and a lateral surface external electrode portion.

First External Electrode

First external electrodes 41 are each provided at positions corresponding to the first extension portion 121. More specifically, the first external electrode 41 is provided at an end portion of the first lateral surface WS1 adjacent to the first end surface LS1 to contact the first extension portion 121. Furthermore, the first external electrode is also provided at an end portion of the second lateral surface WS2 adjacent to the second end surface LS2 to contact the first extension portion 121.

Second External Electrode

The second external electrode 42 is provided at a position corresponding to the second extension portion 122. More specifically, the second external electrode 42 is provided at an end portion of the first lateral surface WS1 adjacent to the second end surface LS2 to contact the second extension portion 122. Furthermore, the second external electrode is also provided in contact with the second extension portion 122 at an end portion of the first lateral surface WS1 adjacent to the first end surface LS1.

Main Surface External Electrode Portion

The first external electrodes 41 and the second external electrode 42 are provided on the first main surface TS1 and the second main surface TS2 in addition to the first lateral surface WS1 and the second lateral surface WS2 described above. That is, each of the first external electrodes 41 includes one lateral surface first external electrode portion 41W and two main surface first external electrode portions 41T continuous with the lateral surface first external electrode portion 41W. Similarly, each of the second external electrodes 42 includes one lateral surface second external electrode portion 42W and two main surface second external electrode portions 42T continuous with the lateral surface second external electrode portion 42W.

Side Gap Portion

Figure 14:
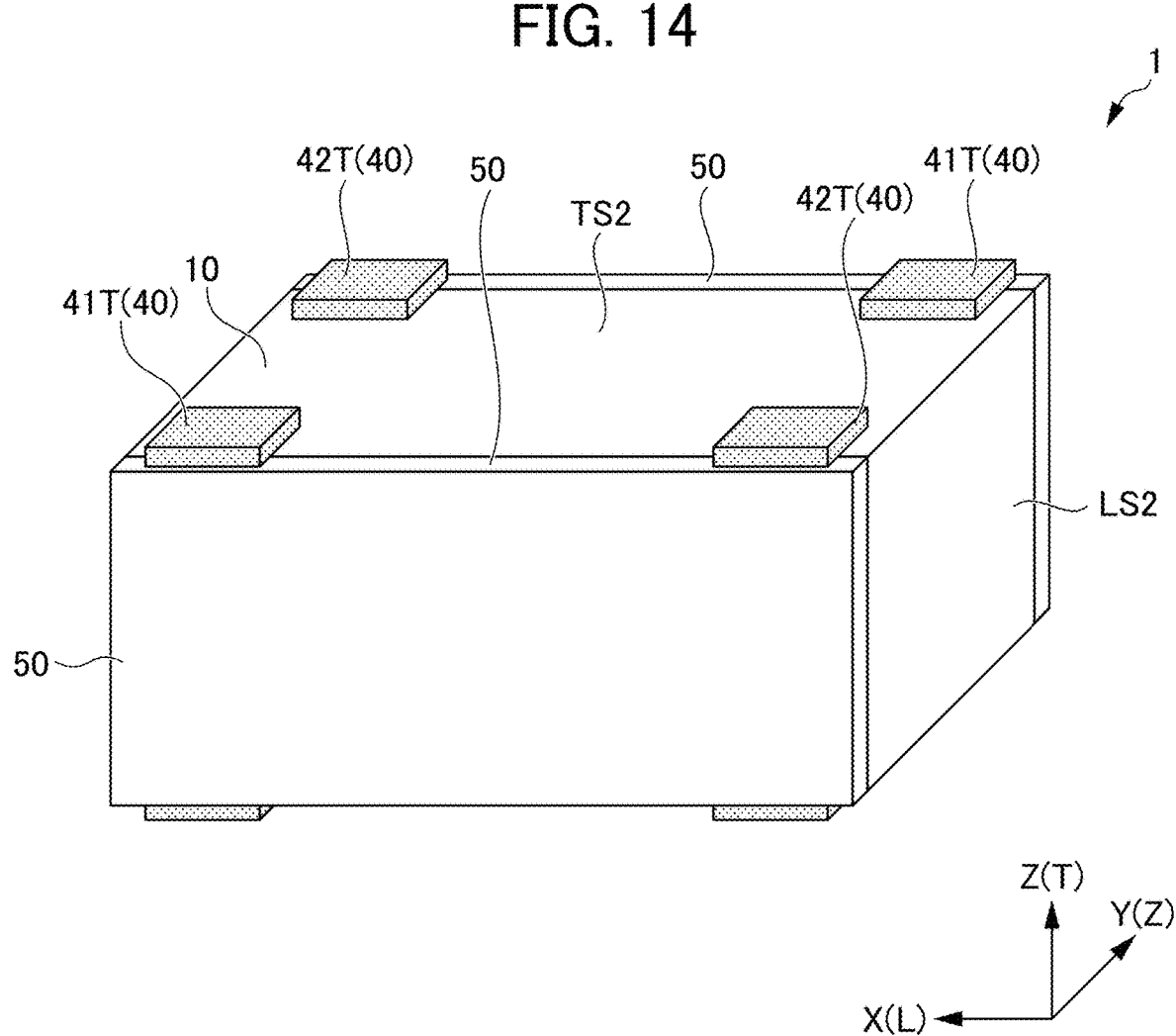
FIG. 14 is a perspective view showing the multilayer ceramic capacitor according to the third preferred embodiment of the present invention.

The side gap portion 50 will be described with reference to FIG. 14. The side gap portions 50 are provided on the first lateral surface WS1 and the second lateral surface WS2 of the multilayer body 10. The side gap portions 50 each cover the first external electrode 41 and the second external electrode 42. Therefore, the lateral surface first external electrode portion 41W of the first external electrode 41 is covered with the side gap portion 50 and is not exposed. As a result, in the first external electrode 41, only the main surface first external electrode portions 41T are exposed at the first main surface TS1 and the second main surface TS2. The same applies to the second external electrode 42. The lateral surface second external electrode portion 42W of the second external electrode 42 is covered with the side gap portion 50 and is not exposed. As a result, in the second external electrode 42, only the main surface second external electrode portion 42T is exposed at the first main surface TS1 and the second main surface TS2.

Advantageous Effect of Third Preferred Embodiment

According to the multilayer ceramic capacitor 1 of the second preferred embodiment, it is possible to easily provide the multi-terminal multilayer ceramic capacitor 1 including the side gap portions 50 and allowing for external connection only via the main surface without using the lateral surface and the end surface. Furthermore, according to the multilayer ceramic capacitor 1 of the third preferred embodiment, it is possible to increase the areas where the lateral surface-first extension electrode portions 71W and the lateral surface second extension electrode portions 72W overlap each other in the vicinity of the first lateral surface WS1 and the vicinity of the second lateral surface WS2. Therefore, it is possible to increase the area of the effective portion 110 while securing the extension portion 120.

Fourth Preferred Embodiment

A fourth preferred embodiment of the present invention will be described with reference to FIGS. 15A to 18. The fourth preferred embodiment is similar to the third preferred embodiment. Therefore, the fourth preferred embodiment will be described focusing on the difference from the third preferred embodiment.

Difference Between Fourth Preferred Embodiment and Third Preferred Embodiment

The difference between the fourth preferred embodiment and the third preferred embodiment is as follows. In the third preferred embodiment, the effective portion 110 is exposed at the first lateral surface WS1 and the second lateral surface WS2. In contrast, in the fourth preferred embodiment, the effective portion 110 is not exposed. This difference is caused by the fact that the length of the extension electrode portion 70 in the length direction L is different between the fourth preferred embodiment and the third preferred embodiment. More specifically, the length in the length direction L of the extension electrode portion 70 in the fourth preferred embodiment is shorter than the length in the length direction L of the extension electrode portion 70 in the third preferred embodiment. Therefore, in the fourth preferred embodiment, unlike the third preferred embodiment, the lateral surface-first extension electrode portion 71W and the lateral surface-second extension electrode portion 72W do not overlap each other in the lamination direction T, and as a result, the effective portion 110 is not provided. Therefore, in the fourth preferred embodiment, the effective portion 110 is not exposed at the first lateral surface WS1 and the second lateral surface WS2.

Notch at Lateral Surface and Extension Electrode Portion

Figure 15A:
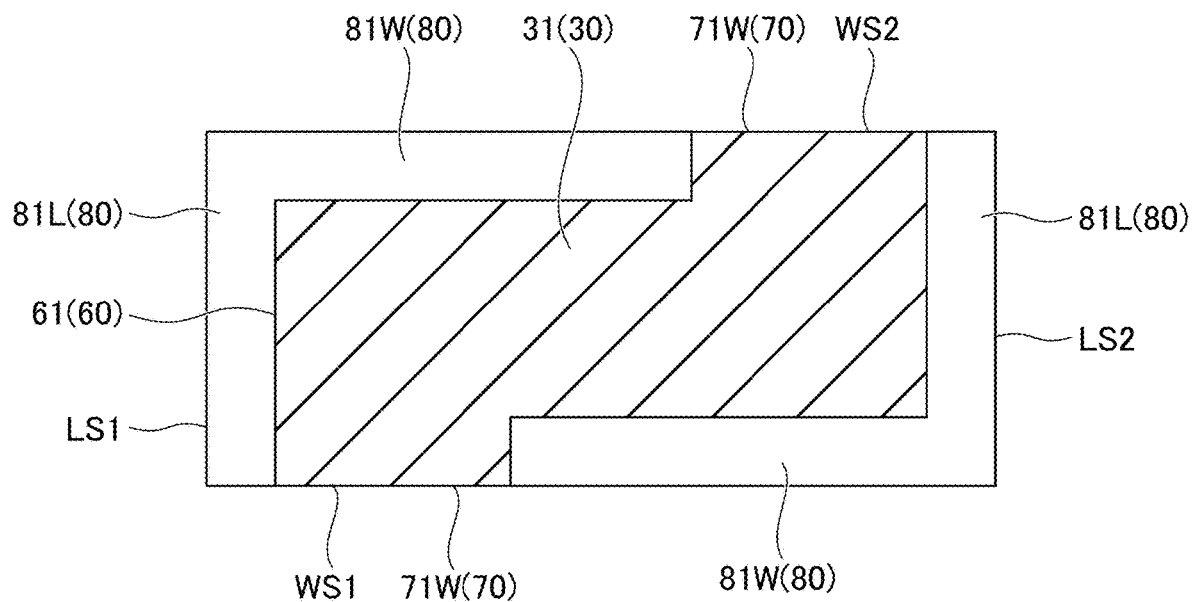
FIGS. 15A and 15B are diagrams showing an internal electrode of a fourth preferred embodiment of the present invention, with FIG. 15A showing a first internal electrode in a plan view, and FIG. 15B showing a second internal electrode in a plan view.
Figure 15B:
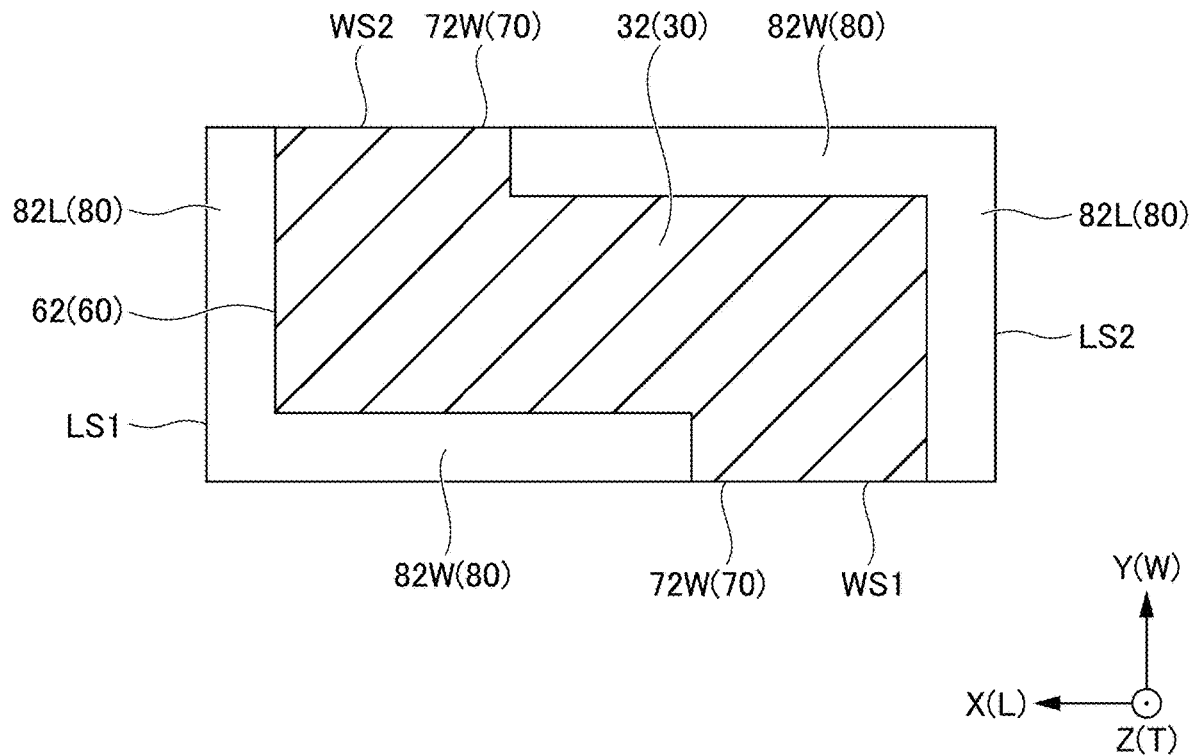
Figure 16:
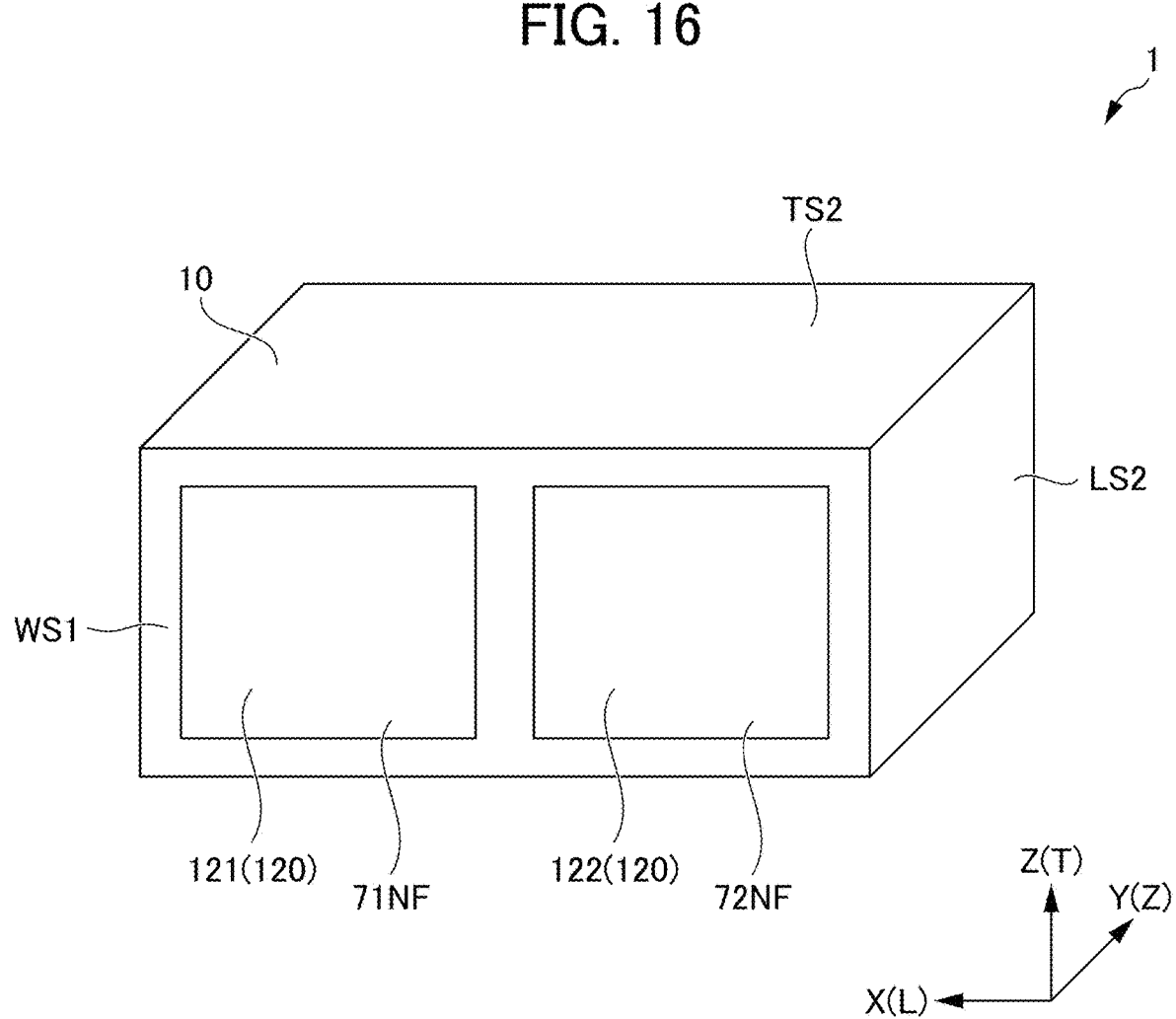
FIG. 16 is a perspective view showing a state before an external electrode and side gap portions are provided in a multilayer ceramic capacitor of the fourth preferred embodiment of the present invention.
Figure 17:
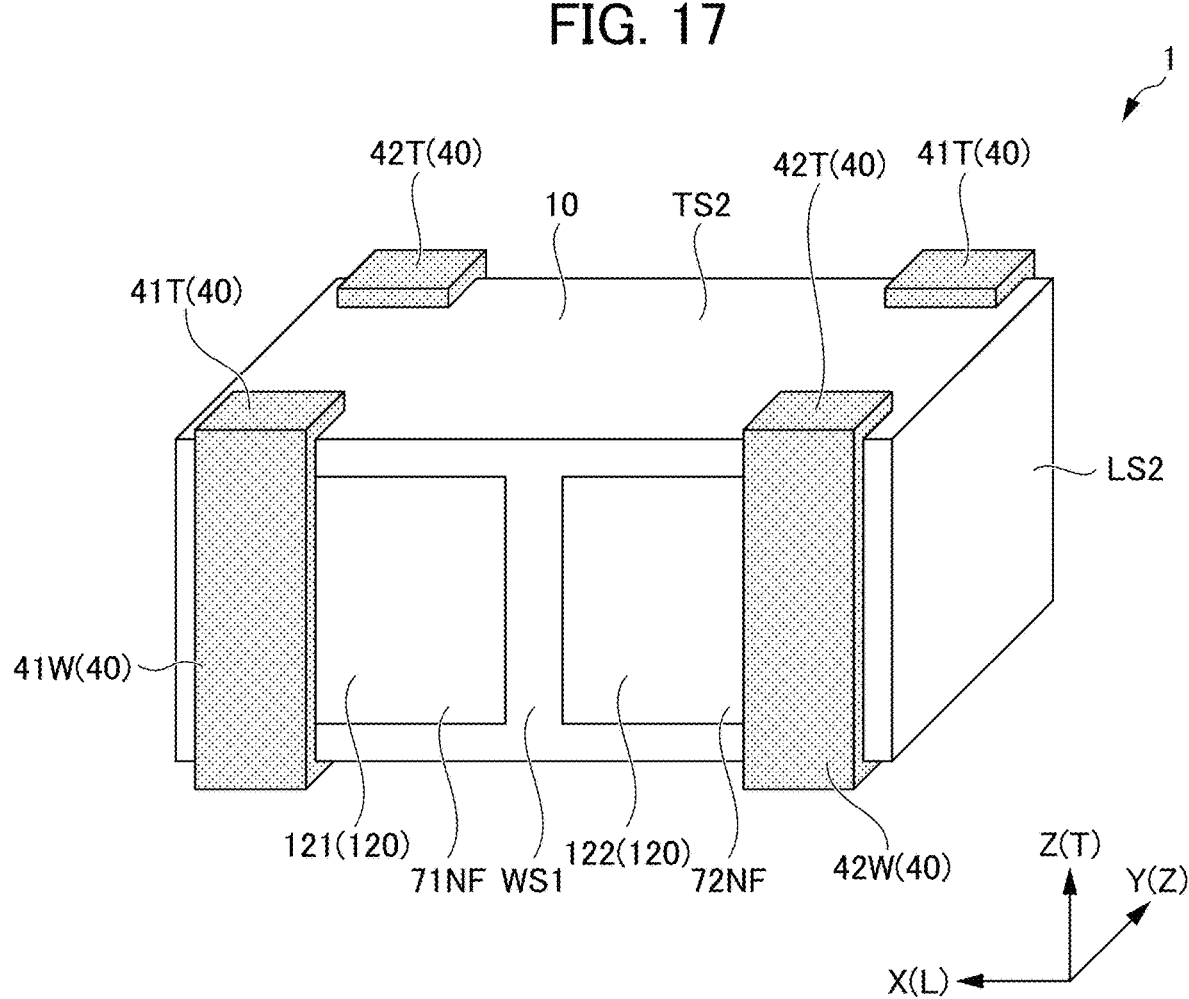
FIG. 17 is a perspective view showing a state before side gap portions are provided in the multilayer ceramic capacitor of the fourth preferred embodiment of the present invention.
Figure 18:
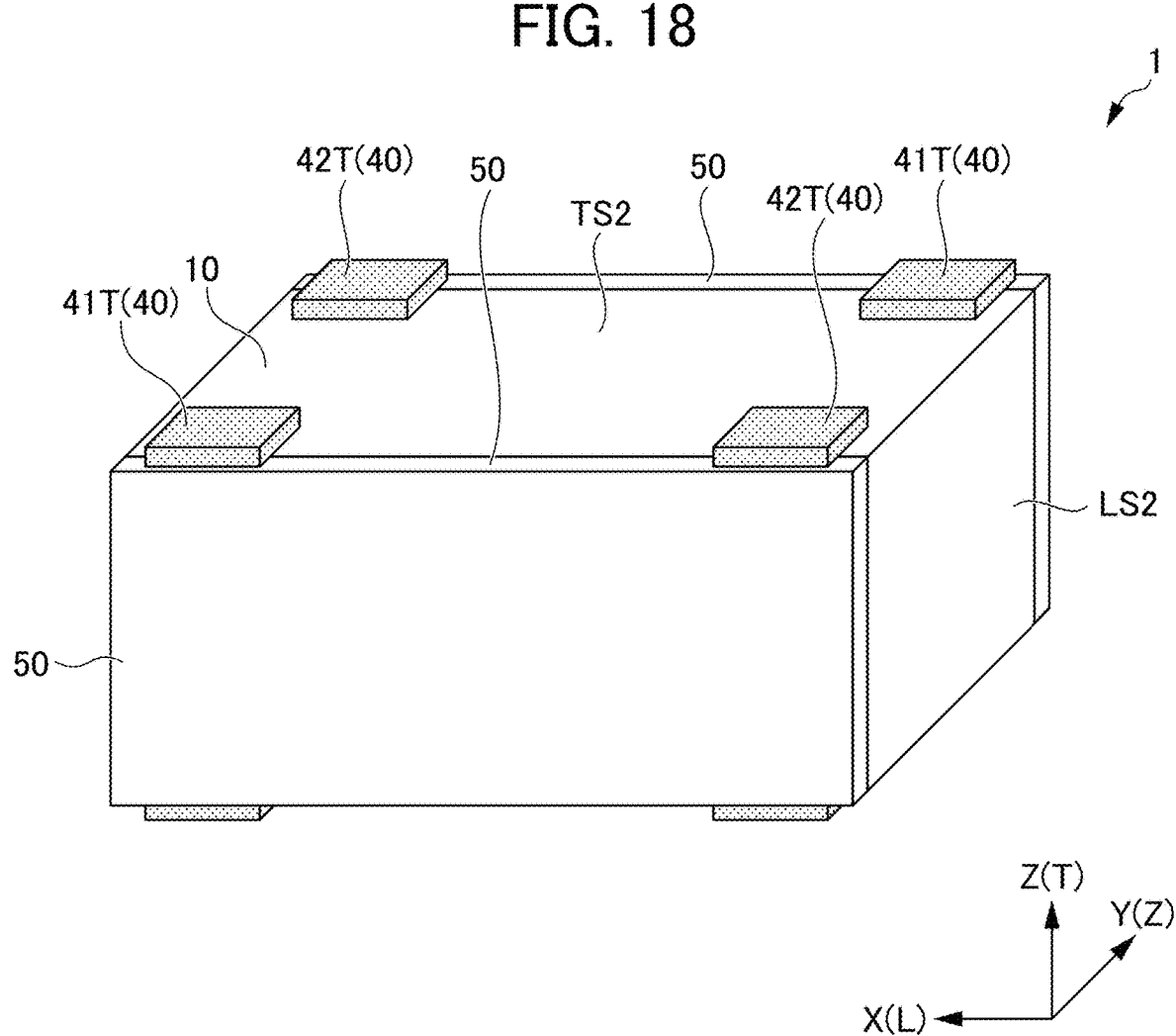
FIG. 18 is a perspective view showing the multilayer ceramic capacitor according to the fourth preferred embodiment of the present invention.

The internal electrode 30 will be described with reference to FIGS. 15A and 15B. In the fourth preferred embodiment, the ratio of the length of the extension electrode portion 70 and the length of the notch 80 in the length direction L at a position corresponding to the lateral surface is reversed from that of the third preferred embodiment. More specifically, in the third preferred embodiment, the length of the extension electrode portion 70 is longer than the length of the notch 80. On the other hand, in the fourth preferred embodiment, the length of the extension electrode portion 70 is shorter than the length of the notch 80. That is, not the extension electrode portion 70 but rather the notch 80 extends from an end portion to the center portion in the length direction L at the position corresponding to the lateral surface. Therefore, in the fourth preferred embodiment, the lateral surface-first extension electrode portion 71W and the lateral surface-second extension electrode portion 72W do not overlap each other in the lamination direction T. That is, a first extension electrode counter portion 71F and a second extension electrode counter portion 72F are not provided. As a result, the effective portion 110 is not provided.

Extension Portion

Next, the extension portion 120 will be described. The extension portion 120 is provided at a position corresponding to the lateral surface-first extension electrode portion 71W and at a position corresponding to the lateral surface-second extension electrode portion 72W. More specifically, as in the third preferred embodiment, one first extension portion 121 and one second extension portion 122 are provided on each of the first lateral surface WS1 and the second lateral surface WS2. However, unlike the third preferred embodiment, the effective portion 110 is not provided between the first extension portion 121 and the second extension portion 122. Furthermore, the lengths of the first extension portion 121 and the second extension portion 122 in the length direction L are longer than those of the third preferred embodiment.

External Electrode and Side Gap Portion

The external electrode 40 and the side gap portion 50 of the fourth preferred embodiment are similar to those of the third preferred embodiment.

Advantage of Fourth Preferred Embodiment

According to the multilayer ceramic capacitor 1 of the fourth preferred embodiment of the present invention, it is possible to reduce or prevent a short circuit at the lateral surfaces of the first internal electrode 31 and the second internal electrode 32. This is because the lateral surface-first extension electrode portion 71W and the lateral surface-second extension electrode portion 72W do not overlap each other in a plan view. Furthermore, it is possible to increase the areas of the first extension portion 121 and the second extension portion 122. This is because the effective portion 110 does not decrease the areas of the first extension portion 121 and the second extension portion 122.

Notch Size

The length of the notch 80 in the length direction L and the length of the notch 80 in the width direction W can be variously set depending on the configuration of the effective portion 110 and the extension portion 120 as described above.

Length Along Surface to be Provided

For example, when the notches 80 are provided at both end portions at a position corresponding to the lateral surface or at a position corresponding to the end surface in the outer shape of the internal electrode 30, the lengths of the notches 80 along the lateral surface or the end surface are each preferably about 10% or more and about 30% or less of the total length of the lateral surface or the end surface where the notch 80 is provided.

When the internal electrode 30 is provided at one end portion at a position corresponding to the lateral surface or at a position corresponding to the end surface in the outer shape of the internal electrode 30, the lengths of the notches 80 along the lateral surface or the end surface are each preferably about 10% or more and about 70% or less of the total length of the lateral surface or the end surface where the notch 80 is provided, for example.

Furthermore, when the internal electrode 30 is provided at the center portion at a position corresponding to the lateral surface or at a position corresponding to the end surface in the outer shape of the internal electrode 30, the lengths of the notches 80 along the lateral surface or the end surface are each preferably 10% or more and 40% or less of the total length of the lateral surface or the end surface where the notch 80 is provided.

Length in Direction Orthogonal to Surface to be Provided

Furthermore, when the notch 80 is provided at a position corresponding to the lateral surface or the end surface in the outer shape of the internal electrode 30, the lengths of the notches 80 in the direction orthogonal to the lateral surface or the end surface are each preferably 5% or more and 20% or less the total length of the outer shape in the direction orthogonal to the lateral surface or the end surface where the notch 80 is provided.

A multilayer ceramic capacitor according to a preferred embodiment of the present invention includes at least one first dielectric layer including at least one first internal electrode, at least one second dielectric layer including at least one second internal electrode, and a multilayer body including the first dielectric layer and the second dielectric layer provided alternately therein, in which the multilayer body includes two main surfaces, two lateral surfaces, and two end surfaces, the multilayer body includes an inner layer portion including the first internal electrode and the second internal electrode laminated alternately therein with the dielectric layer interposed therebetween, outer layer portions that sandwich the inner layer portion in a lamination direction and are made of a dielectric material, and side gap portions that sandwich the inner layer portion and the outer layer portions in a width direction, the multilayer body includes a first external electrode connected to the first internal electrode and a second external electrode connected to the second internal electrode, and the first external electrode includes a main surface electrode portion provided on at least one of the two main surfaces, and a lateral surface electrode portion that is connected to at least one lateral surface side end portion of each of the first internal electrodes and covered with one of the side gap portions.

According to the above configuration, the first external electrode includes the lateral surface electrode portion covered with the side gap portion and the main surface electrode portion provided on the main surface. Therefore, it is possible to provide a multi-terminal multilayer ceramic capacitor including three or more terminals to which a method of providing the side gap portion later can be easily applied.

In the above multilayer ceramic capacitor, the main surface electrode portion of the first external electrode may be provided on each of the two main surfaces.

According to the above configuration, the main surface electrode portions are provided on both main surfaces. Therefore, the internal electrode and the wiring substrate or the external wiring can be easily connected to each other.

In the above multilayer ceramic capacitor, the lateral surface electrode portion of the first external electrode may be connected to a lateral surface side end portion of each of the first internal electrodes.

According to the above configuration, the lateral surface electrode portion is connected to the lateral surface side end portion of the first internal electrode. Therefore, the first external electrode can be connected to the first internal electrode at the lateral surface and can be connected to the wiring substrate or the external wiring on the main surface without being exposed at the lateral surface.

In the above multilayer ceramic capacitor, the second external electrode may include a main surface electrode portion provided on at least one of the two main surfaces, and a lateral surface electrode portion that is connected to at least one lateral surface side end portion of each of the second internal electrodes and covered with one of the side gap portions.

According to the above configuration, the second external electrode includes the main surface electrode portion provided on the main surface, and the lateral surface electrode portion connected to the second internal electrode at the lateral surface side end portion and covered with the side gap portion. Therefore, it is possible to connect the second internal electrode to the wiring substrate or the external wiring without the second internal electrode being exposed at the lateral surface.

In the above multilayer ceramic capacitor, the main surface electrode portion of the second external electrode may be provided on each of the two main surfaces.

According to the above configuration, the main surface electrode portion of the second external electrode is provided on both main surfaces. Therefore, it is easy to connect the second internal electrode as well as the first internal electrode to the wiring substrate or the external wiring.

In the above multilayer ceramic capacitor, the lateral surface electrode portion of the second external electrode may be connected to a lateral surface side end portion of each of the second internal electrodes.

According to the above configuration, the lateral surface electrode portion is connected to the lateral surface side end portion of the second internal electrode. Therefore, the second external electrode can be connected to the second internal electrode on the lateral surface and can be connected to the wiring substrate or the external wiring on the main surface without being exposed at the lateral surface.

In the above multilayer ceramic capacitor, the main surface electrode portion of the first external electrode and the main surface electrode portion of the second external electrode may be opposed to each other in the width direction on at least one of the main surfaces.

According to the above configuration, the main surface electrode portion of the first external electrode and the main surface electrode portion of the second external electrode are opposed to each other in the width direction on the main surface. Therefore, the connection of the external wiring to the first external electrode and the connection of the external wiring to the second external electrode can be divided into both sides of the multilayer ceramic capacitor.

In the above multilayer ceramic capacitor, the first internal electrode may include a first main electrode portion and a first extension electrode portion that is connected to the first main electrode portion and extends toward at least one of the two lateral surfaces, the second internal electrode may include a second main electrode portion and a second extension electrode portion that is connected to the second main electrode portion and extends toward at least one of the two lateral surfaces, the first main electrode portion and the second main electrode portion may be opposed to each other in the lamination direction, the first extension electrode portion and the second extension electrode portion may each include a counter portion at which the first extension electrode portion and the second extension electrode portion are partially opposed to each other in the lamination direction, the lateral surface electrode portion of the first external electrode may be connected to a portion which does not correspond to the counter portion of the first extension electrode portion, and the lateral surface electrode portion of the second external electrode may be connected to a portion which does not correspond to the counter portion of the second extension electrode portion.

According to the above configuration, the first extension electrode portion and the second extension electrode portion include the counter portion at which the first extension electrode portion and the second extension electrode portion are partially opposed to each other in the lamination direction. Therefore, it is possible to increase the area of the effective portion.

In the above multilayer ceramic capacitor, the first internal electrode may include a first main electrode portion and a first extension electrode portion that is connected to the first main electrode portion and extends toward at least one of the two lateral surfaces, the second internal electrode may include a second main electrode portion and a second extension electrode portion that is connected to the second main electrode portion and extends toward at least one of the two lateral surfaces, the first main electrode portion and the second main electrode portion may be opposed to each other in the lamination direction, and the first extension electrode portion and the second extension electrode portion may not be opposed to each other in the lamination direction.

According to the above configuration, the first extension electrode portion and the second extension electrode portion are not opposed to each other in the lamination direction. Therefore, the selective connection between the external electrode and the first internal electrode or the second internal electrode on the lateral surface is facilitated.

In the above multilayer ceramic capacitor, the first internal electrode may include a first main electrode portion, the second internal electrode may include a second main electrode portion and a second extension electrode portion that is connected to the second main electrode portion and extends toward at least one of the two end surfaces, the second internal electrode may include a notch at a portion of a region that is adjacent to at least one of the lateral surfaces and opposed to the first main electrode portion, the first main electrode portion and the second main electrode portion may be opposed to each other in the lamination direction, the lateral surface electrode portion of the first external electrode may be connected to a portion where the first internal electrode and the notch are opposed to each other, and the second external electrode may be connected to the second extension electrode portion.

According to the above configuration, the first external electrode is connected to a portion where the first internal electrode and the notch of the second internal electrode are opposed to each other. This facilitates the selective connection between the first external electrode and the first internal electrode.

Although preferred embodiments of the present invention have been described above, the present invention is not limited to the preferred embodiments described above, and various changes and modifications thereto are possible.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    at least one first dielectric layer including at least one first internal electrode;
    at least one second dielectric layer including at least one second internal electrode; and
    a multilayer body including the first dielectric layer and the second dielectric layer provided alternately therein; wherein
    the multilayer body includes two main surfaces, two lateral surfaces, and two end surfaces;
    the multilayer body includes an inner layer portion including the first internal electrode and the second internal electrode laminated alternately therein with the dielectric layer interposed therebetween, outer layer portions that sandwich the inner layer portion in a lamination direction and are made of a dielectric material, and side gap portions that sandwich the inner layer portion and the outer layer portions in a width direction;
    the multilayer body includes a first external electrode connected to the first internal electrode and a second external electrode connected to the second internal electrode;
    the first external electrode includes a main surface electrode portion provided on at least one of the two main surfaces, and a lateral surface electrode portion on one of the two lateral surfaces that is connected to at least one lateral surface side end portion of each of the first internal electrodes and covered with one of the side gap portions such that the one of the side gap portions defines an outermost surface of the multilayer ceramic capacitor at a portion where the side gap portion covers the lateral surface electrode portion; and
    the one of the two lateral surfaces is flat or substantially flat.

2. The multilayer ceramic capacitor according to claim 1, wherein the main surface electrode portion of the first external electrode is provided on each of the two main surfaces.

3. The multilayer ceramic capacitor according to claim 1, wherein the lateral surface electrode portion of the first external electrode is connected to a lateral surface side end portion of each of the first internal electrodes.

4. The multilayer ceramic capacitor according to claim 1, wherein the second external electrode includes:
    a main surface electrode portion provided on at least one of the two main surfaces; and
    a lateral surface electrode portion that is connected to at least one lateral surface side end portion of each of the second internal electrodes and is covered with one of the side gap portions.

5. The multilayer ceramic capacitor according to claim 4, wherein the main surface electrode portion of the second external electrode is provided on each of the two main surfaces.

6. The multilayer ceramic capacitor according to claim 4, wherein the lateral surface electrode portion of the second external electrode is connected to a lateral surface side end portion of each of the second internal electrodes.

7. The multilayer ceramic capacitor according to claim 4, wherein the main surface electrode portion of the first external electrode and the main surface electrode portion of the second external electrode are opposed to each other in the width direction on at least one of the main surfaces.

8. The multilayer ceramic capacitor according to claim 4, wherein
the first internal electrode includes a first main electrode portion, and a first extension electrode portion that is connected to the first main electrode portion and extends toward at least one of the two lateral surfaces;
the second internal electrode includes a second main electrode portion, and a second extension electrode portion that is connected to the second main electrode portion and extends toward at least one of the two lateral surfaces;
the first main electrode portion and the second main electrode portion are opposed to each other in the lamination direction;
the first extension electrode portion and the second extension electrode portion each include a counter portion at which the first extension electrode portion and the second extension electrode portion are partially opposed to each other in the lamination direction;
the lateral surface electrode portion of the first external electrode is connected to a portion which does not correspond to the counter portion of the first extension electrode portion; and
the lateral surface electrode portion of the second external electrode is connected to a portion which does not correspond to the counter portion of the second extension electrode portion.

9. The multilayer ceramic capacitor according to claim 4, wherein
the first internal electrode includes a first main electrode portion and a first extension electrode portion that is connected to the first main electrode portion and extends toward at least one of the two lateral surfaces;
the second internal electrode includes a second main electrode portion and a second extension electrode portion that is connected to the second main electrode portion and extends toward at least one of the two lateral surfaces;
the first main electrode portion and the second main electrode portion are opposed to each other in the lamination direction; and
the first extension electrode portion and the second extension electrode portion are not opposed to each other in the lamination direction.

10. The multilayer ceramic capacitor according to claim 4, wherein
the first internal electrode includes a first main electrode portion;
the second internal electrode includes a second main electrode portion and a second extension electrode portion that is connected to the second main electrode portion and extends toward at least one of the two end surfaces;
the second internal electrode includes a notch at a portion of a region that is adjacent to at least one of the lateral surfaces and opposed to the first main electrode portion;
the first main electrode portion and the second main electrode portion are opposed to each other in the lamination direction;
the lateral surface electrode portion of the first external electrode is connected to a portion where the first internal electrode and the notch are opposed to each other; and
the second external electrode is connected to the second extension electrode portion.

11. The multilayer ceramic capacitor according to claim 1, wherein the multilayer body includes an effective portion where the first internal electrode and the second internal electrode are opposed to each other, and a capacitance is generated in the effective portion, and the effective portion is exposed at the first and second lateral surfaces.

12. The multilayer ceramic capacitor according to claim 1, wherein the multilayer body includes an effective portion where the first internal electrode and the second internal electrode are opposed to each other, and a capacitance is generated in the effective portion, and the effective portion is not exposed at the first and second lateral surfaces.

13. The multilayer ceramic capacitor according to claim 1, wherein the first internal electrode and the first external electrode are connected at one position at one of the two lateral surfaces, and the second internal electrode and the second external electrode are connected at two positions at the two end surfaces.

14. The multilayer ceramic capacitor according to claim 1, wherein the first internal electrode and the first external electrode are connected at two positions at a first of the two lateral surfaces and at one position at a second of the two lateral surfaces, and the second internal electrode and the second external electrode are connected at one position at a first of the two lateral surfaces and at two positions at a second of the two lateral surfaces.

15. The multilayer ceramic capacitor according to claim 1, wherein the first internal electrode and the first external electrode are connected at two positions at the two lateral surfaces, and the second internal electrode and the second external electrode are connected at two positions at the two lateral surfaces.

16. The multilayer ceramic capacitor according to claim 1, wherein at least one of the first internal electrode and the second internal electrode includes a notch.

17. The multilayer ceramic capacitor according to claim 1, wherein each of the first internal electrode and the second internal electrode includes a notch.

18. The multilayer ceramic capacitor according to claim 17, wherein the notch of the first internal electrode and the notch of the second internal electrode are at different positions.

19. The multilayer ceramic capacitor according to claim 1, wherein each of the first internal electrode and the second internal electrode includes a plurality of notches.

20. The multilayer ceramic capacitor according to claim 19, wherein the notches of the first internal electrode and the notches of the second internal electrode are at different positions.

* * * * *